United States Patent
Katsuki et al.

(10) Patent No.: US 12,462,694 B2
(45) Date of Patent: Nov. 4, 2025

(54) ROUTE PLANNING DEVICE, ROUTE PLANNING METHOD, AND COMPUTER PROGRAM PRODUCT

(71) Applicant: KABUSHIKI KAISHA TOSHIBA, Tokyo (JP)

(72) Inventors: Rie Katsuki, Kawasaki (JP); Noriyuki Hirayama, Fuchu (JP); Toshimitsu Kaneko, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 259 days.

(21) Appl. No.: 17/822,311

(22) Filed: Aug. 25, 2022

(65) Prior Publication Data

US 2023/0122583 A1    Apr. 20, 2023

(30) Foreign Application Priority Data

Oct. 18, 2021    (JP) .................. 2021-170495

(51) Int. Cl.
| | |
|---|---|
| G08G 5/32 | (2025.01) |
| G08G 5/22 | (2025.01) |
| G08G 5/34 | (2025.01) |
| G08G 5/55 | (2025.01) |
| G08G 5/57 | (2025.01) |

(Continued)

(52) U.S. Cl.
CPC .............. *G08G 5/32* (2025.01); *G08G 5/22* (2025.01); *G08G 5/34* (2025.01); *G08G 5/55* (2025.01); *G08G 5/57* (2025.01); *G08G 5/59* (2025.01); *G08G 5/80* (2025.01)

(58) Field of Classification Search
None
See application file for complete search history.

(56) References Cited

U.S. PATENT DOCUMENTS 9,821,801 B2 *  11/2017  Di Cairano ........ G01C 21/3407
10,810,688 B1 * 10/2020  Lemons ............ G06Q 10/0637

(Continued)

FOREIGN PATENT DOCUMENTS

| JP | 2011-113488 A | 6/2011 |
| JP | 2012-190405 A | 10/2012 |

(Continued)

OTHER PUBLICATIONS

Fetanat, Masoud, et al. "Optimization of dynamic mobile robot path planning based on evolutionary methods", IEEE, Sep. 21, 2015 (Year: 2015).*

(Continued)

*Primary Examiner* — Navid Z. Mehdizadeh
*Assistant Examiner* — Sarah A. Mueller
(74) *Attorney, Agent, or Firm* — Oblon, McClelland, Maier & Neustadt, L.L.P.

(57) ABSTRACT

A route planning device includes a memory and one or more processors coupled to the memory. The one or more processors are configured to: calculate a tentative route passing through a plurality of tour points disposed in a virtual space that is acquired by removing an obstacle from a space including the obstacle; and derive a route with one or more via points added around an interference point between the obstacle included in the space and the tentative route with a calculation accuracy corresponding to a precision of via point calculation.

16 Claims, 12 Drawing Sheets

(51) Int. Cl.
*G08G 5/59* (2025.01)
*G08G 5/80* (2025.01)

(56) References Cited

U.S. PATENT DOCUMENTS

| | | | |
|---|---|---|---|
| 2013/0024107 A1 | 1/2013 | Xie et al. | |
| 2014/0379179 A1* | 12/2014 | Goossen | G08G 5/54 |
| | | | 701/16 |
| 2018/0364060 A1* | 12/2018 | Katsuki | G01C 21/3492 |
| 2019/0170519 A1* | 6/2019 | Anwar | G01C 21/3841 |
| 2023/0244235 A1* | 8/2023 | Okada | G05D 1/0238 |
| | | | 701/26 |

FOREIGN PATENT DOCUMENTS

| | | |
|---|---|---|
| JP | 2019-006143 A | 1/2019 |
| JP | 2020-161091 A | 10/2020 |

OTHER PUBLICATIONS

Zhao, Kun, et al., "3D Detection for Occluded Vehicles From Point Clouds", Apr. 8, 2021, IEEE Intelligent Transportation Systems Magazine (Year: 2021).*

Japanese Office Action dated Dec. 3, 2024, issued in Japanese Patent Application No. 2021-170495 (with English translation).

* cited by examiner p1 HIGH p1 LOW

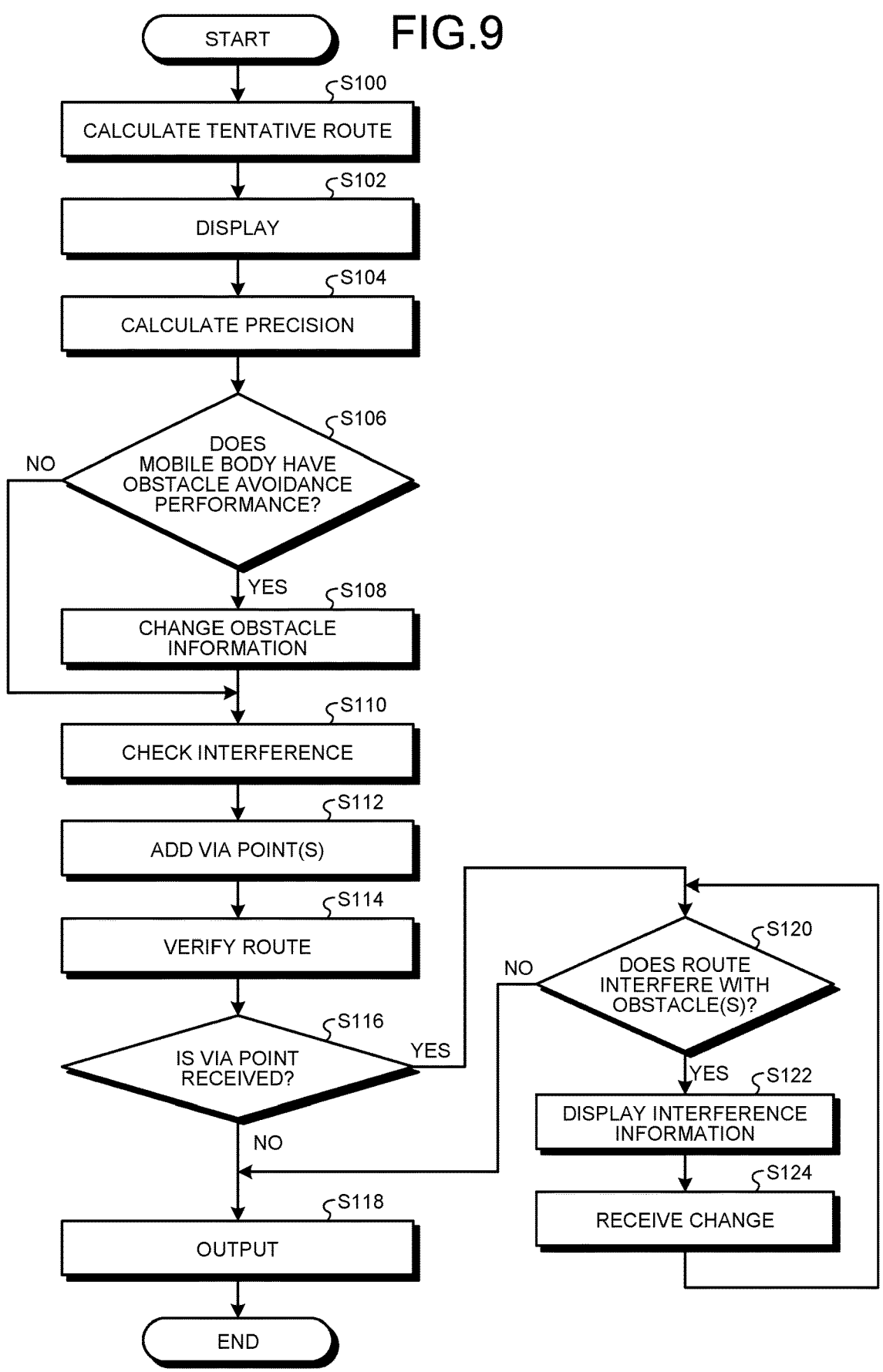

10, 10B

ROUTE PLANNING DEVICE, ROUTE PLANNING METHOD, AND COMPUTER PROGRAM PRODUCT

CROSS-REFERENCE TO RELATED APPLICATIONS

This application is based upon and claims the benefit of priority from Japanese Patent Application No. 2021-170495, filed on Oct. 18, 2021; the entire contents of which are incorporated herein by reference.

FIELD

Embodiments described herein relate generally to a route planning device, a route planning method, and a computer program product.

BACKGROUND

Systems that calculate routes for avoiding collisions with obstacles are known. For example, there is a disclosed system that calculates a route via a plurality of nodes by adding a node around a node that interferes with an obstacle and replacing the added node with the interfering node.

However, the conventional technology always searches for nodes with high calculation accuracy in order to add the nodes that are necessarily not interfering with the obstacles, which may result in increasing the route calculation time.

It is an object of the present disclosure to provide a route planning device, a route planning method, and a computer program product capable of shortening the route calculation time.

BRIEF DESCRIPTION OF THE DRAWINGS

FIG. 9 is a flowchart illustrating a flow of information processing.

DETAILED DESCRIPTION

According to one embodiment, a route planning device includes a memory and one or more processors coupled to the memory. The one or more processors are configured to: calculate a tentative route passing through a plurality of tour points disposed in a virtual space that is acquired by removing an obstacle from a space including the obstacle; and derive with a calculation accuracy corresponding to a precision of via point calculation, a route with one or more via points added around an interference point between the obstacle included in the space and the tentative route.

With reference to the accompanying drawings, a route planning device, a route planning method, and a route planning program will be described in detail hereinafter.

First Embodiment

Figure 1:
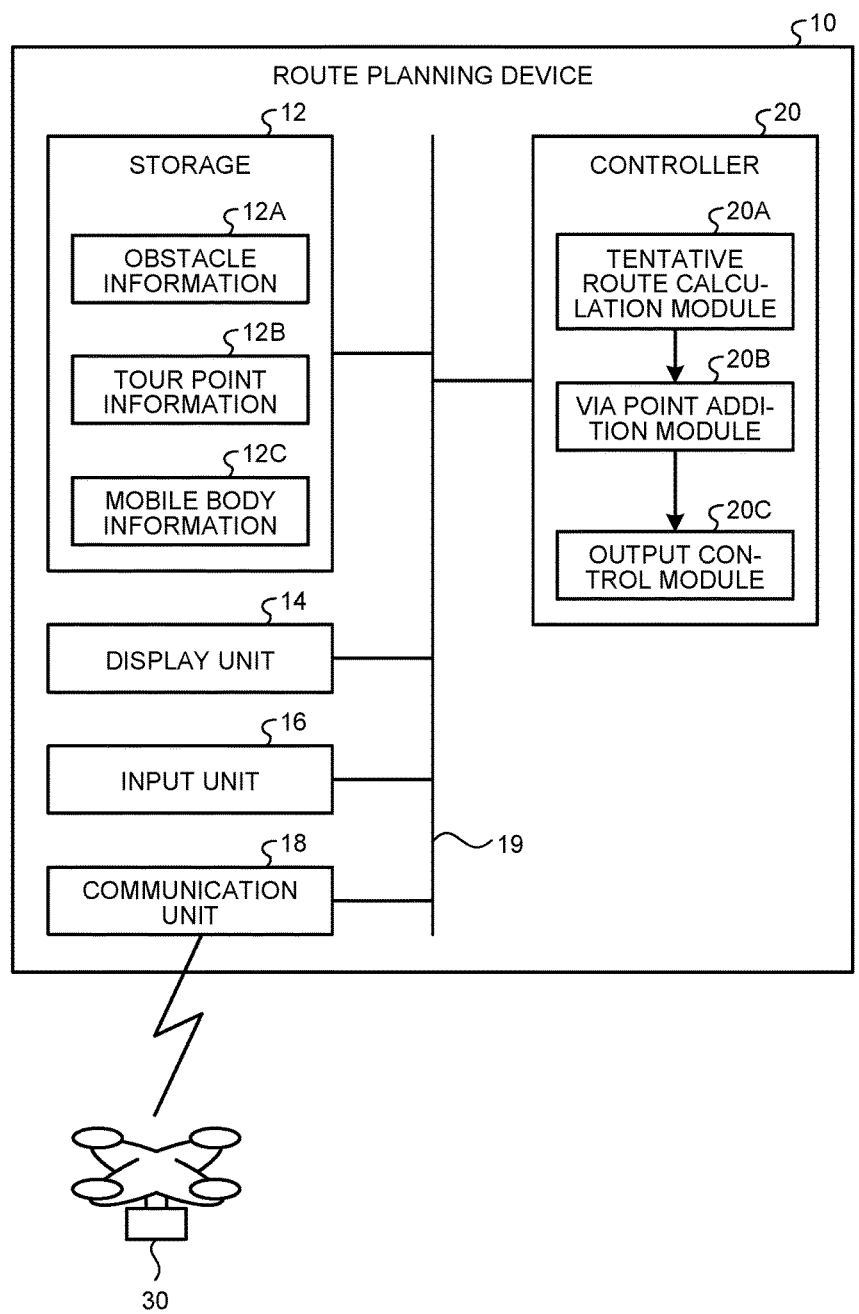
FIG. 1 is a schematic diagram of a route planning system according to an embodiment.

FIG. 1 is a schematic diagram illustrating an example of a route planning system 1 according to a first embodiment.

The route planning system 1 includes a route planning device 10 and a mobile body 30. The route planning device 10 and the mobile body 30 are communicatively connected.

The route planning device 10 is an information processing device that calculates a route of the mobile body 30.

The mobile body 30 is a movable object that moves along the route calculated by the route planning device 10. The mobile body 30 may be a flying object, a ship, a vehicle, a robot, or the like, for example. The flying object may be a drone, an airplane, or the like, for example. The vehicle may be a four-wheel automobile, a motorbike, or the like, for example. The mobile body 30 may be a structure in which the position of a main body part is fixed and part of mechanisms provided to the main body part moves. For example, the mobile body 30 may be a robot arm. The mobile body 30 may be any mobile unit that moves via driving operations of a person, and any mobile body that can move autonomously without driving operations of a person. The mobile body 30 may be a holonomic mobile body capable of moving in all directions including forward, backward, left, right, up, down, and diagonal directions, as well as on-the-spot turning, and the like, or may be a non-holonomic mobile body.

In the present embodiment, a mode in which the mobile body 30 is a holonomic drone will be described as an example.

A route herein is a route that passes through a plurality of tour points defined in advance.

The tour points are points that the mobile body 30 ought to pass through. The tour points include a start point and a goal point, for example. The start point is a starting point of the route, that is, the point of departure. The goal point is the end point of the route, that is, the point to be the goal.

The tour points may include a plurality of points between the start point and the goal point. The points between the start point and the goal point include the points where the mobile body 30 executes a predetermined task on a work target, for example. The work target is, for example, a target of a task such as an inspection. Specifically, the work target may be a board surface of an instrument, or the like. The tasks defined in advance may be sensing of the work target, for example. Sensing of the work target specifically includes capturing an image of the work target, measuring various parameters of the work target, and the like.

The route planning device 10 calculates a route that avoids collisions with obstacles. Details of the route calculation will be described later.

The route planning device 10 includes a storage 12, a display unit 14, an input unit 16, a communication unit 18, and a controller 20. The storage 12, the display unit 14, the input unit 16, the communication unit 18, and the controller 20 are communicatively connected via a bus 19 and the like.

The storage 12, the display unit 14, the input unit 16, and the communication unit 18 may simply be configured to be connected to the controller 20 communicatively with wire or wirelessly. At least one of the storage 12, the display unit 14, and the input unit 16 may be connected to the controller 20 via a network.

At least one of the storage 12, the display unit 14, and the input unit 16 may be provided outside the route planning device 10, or at least one of a single or a plurality of functional units included in the storage 12, the display unit 14, the input unit 16, and the controller 20 may be loaded in an external information processing device that is communicatively connected to the route planning device 10 via a network, or the like.

The storage 12 stores various kinds of data. In the present embodiment, the storage 12 stores in advance obstacle information 12A, tour point information 12B, and mobile body information 12C, and the like.

The obstacle information 12A is information regarding an obstacle included in a moving target area of the mobile body 30. In the present embodiment, the obstacle information 12A is information indicating the position coordinates of each of a plurality of elements configuring the obstacle in a three-dimensional space and the impact severity of each of the elements.

In more detail, the obstacle information 12A is information that expresses an obstacle 46 by a group of elements. A group of elements is expressed by a group of points, a group of voxels each being a unit of a regular grid in a three-dimensional space, a group of polygons each being a basic polygonal shape when an obstacle is modeled as a polyhedron, and the like. The obstacle information 12A includes the information indicating the position coordinates of each of the elements configuring the obstacle in a three-dimensional space.

The collision severity is the information indicating the severity when the mobile body 30 collides with the obstacle. For example, information indicating the collision severity of a higher (greater) value is given for the elements of the obstacle that imposes a more serious influence such as shutdown of the business, or the like. In the obstacle information 12A, information indicating the collision severity is given in advance for each of the elements configuring the obstacle. Hereinafter, the collision severity may be referred to as collision severity $m_{col}$.

The tour point information 12B is information indicating the position coordinates of the tour points included in the moving target area of the mobile body 30 in a three-dimensional space. For example, the tour point information 12B includes information indicating the position coordinates of each of the start point, the goal point, and a point or a plurality of points between the start point and the goal point. The tour point information 12B may also include information regarding at least one selected from the work content executed by the mobile body 30 at each of the tour points, the stopped time at the tour points, the posture of the mobile body 30 at the tour points, and the position coordinates and posture of the work target at the tour points.

The mobile body information 12C is information regarding the mobile body 30. In the present embodiment, the mobile body information 12C includes information representing the size of the mobile body 30 and the obstacle avoidance performance of the mobile body 30. The size of the mobile body 30 is information indicating the range the mobile body 30 occupies in an actual space. The size of the mobile body 30 is expressed by, for example, information indicating the maximum length in each of the directions in which the mobile body 30 can move.

The obstacle avoidance performance indicates the ability of the mobile body 30 to avoid obstacles. The obstacle avoidance performance is expressed by the presence or absence of an obstacle avoidance function, or the level of the obstacle avoidance performance. The obstacle avoidance function means a function that detects and reflexively avoid obstacles on the route. The obstacle avoidance performance is the level of the obstacle avoidance function, and the higher the obstacle avoidance performance is, the greater the value of the level of the obstacle avoidance performance becomes. In the present embodiment, a mode in which the obstacle avoidance performance is expressed by the level of obstacle avoidance performance will be described as an example.

The obstacle avoidance performance is defined by at least one selected from the observation accuracy of the mobile body 30 and the positioning accuracy of the mobile body 30. This is because the obstacle avoidance performance is determined by the observation performance and the control performance especially for the mobile body 30 that moves autonomously. In other words, the success rate of obstacle avoidance can be improved when a sensor mounted on the mobile body 30 can measure the obstacle with high accuracy, and the success rate of obstacle avoidance can be improved when the positioning accuracy of the mobile body 2 is high. In the present embodiment, a mode in which the obstacle avoidance performance is determined by the observation accuracy of the mobile body 30 and the positioning accuracy of the mobile body 30 will be described as an example.

The observation accuracy of the mobile body 30 indicates the observation accuracy of the external world of the mobile body 30 acquired by the mobile body 30. The observation accuracy of the mobile body 30 is defined by the sensor mounted on the mobile body 30, the positioning accuracy of the mobile body 30, and the like. The positioning accuracy of the mobile body 30 indicates the degree capable of accurately positioning the mobile body 30 at a desired position and the degree capable of more accurately achieving the desired posture. The positioning accuracy of the mobile body 30 is defined by the sensor mounted on the mobile body 30, the accuracy of a driving mechanism of the mobile body 30, and the like.

For example, the obstacle avoidance performance is expressed by a weighted sum of the observation accuracy of the mobile body 30 and the positioning accuracy of the mobile body 30. Specifically, the obstacle avoidance performance is expressed by following equation (1).

$$m_{obs} = k_{o1} m_{o1} + k_{o2} m_{o2} \tag{1}$$

In equation (1), $m_{obs}$ represents the obstacle avoidance performance. In detail, $m_{obs}$ represents the level of the obstacle avoidance performance. The higher the level of the obstacle avoidance performance is, the greater the value of $m_{obs}$ becomes. In equation (1), $m_{o1}$ represents the observation accuracy. The higher the observation accuracy is, the greater the value of $m_{o1}$ becomes. Note that $m_{o2}$ represents the positioning accuracy. The higher the positioning accuracy is, the greater the value of $m_{o2}$ becomes. Note that $k_{o1}$ and $k_{o2}$ represent gains. Furthermore, $k_{o1}$ and $k_{o2}$ may be set in advance in accordance with the mobile body 30. In explanations hereinafter, the level of the obstacle avoidance performance may be referred to as the obstacle avoidance performance or the obstacle avoidance performance $m_{obs}$.

Furthermore, in the explanations hereinafter, the observation accuracy may be referred to as observation accuracy $m_{o1}$ and the positioning accuracy may be referred to as positioning accuracy $m_{o2}$.

The display unit 14 displays various kinds of information. The display unit 14 may be a display, a projection device, or the like, for example. The input unit 16 receives operation input made by the user. The input unit 16 may be a pointing device such as a mouse and a touchpad, a keyboard, or the like, for example. The display unit 14 and the input unit 16 may also be an integrated touch panel. The communication unit 18 is a communication interface for having communication with information processing devices outside the route planning device 10 and the mobile body 30.

The controller 20 executes information processing in the route planning device 10. The controller 20 includes a tentative route calculation module 20A, a via point addition module 20B, and an output control module 20C.

The tentative route calculation module 20A, the via point addition module 20B, and the output control module 20C are achieved by a single or a plurality of processors, for example. For example, each of the above units may also be achieved by having a processor such as a central processing unit (CPU) execute a computer program, that is, by software. Each of the above units may also be achieved by a processor such as a dedicated IC, that is, by hardware. Each of the above units may also be achieved by using a combination of software and hardware. In a case of using a plurality of processors, each of the processors may achieve one of the units or may achieve two or more of the units.

The controller 20 may simply need to include at least the tentative route calculation module 20A and the via point addition module 20B, and may be configured without the output control module 20C. In the present embodiment, a mode in which the controller 20 includes the tentative route calculation module 20A, the via point addition module 20B, and the output control module 20C will be described as an example.

The tentative route calculation module 20A calculates a tentative route. The tentative route calculation module 20A calculates a tentative route based on the tour point information 12B.

Figure 2:
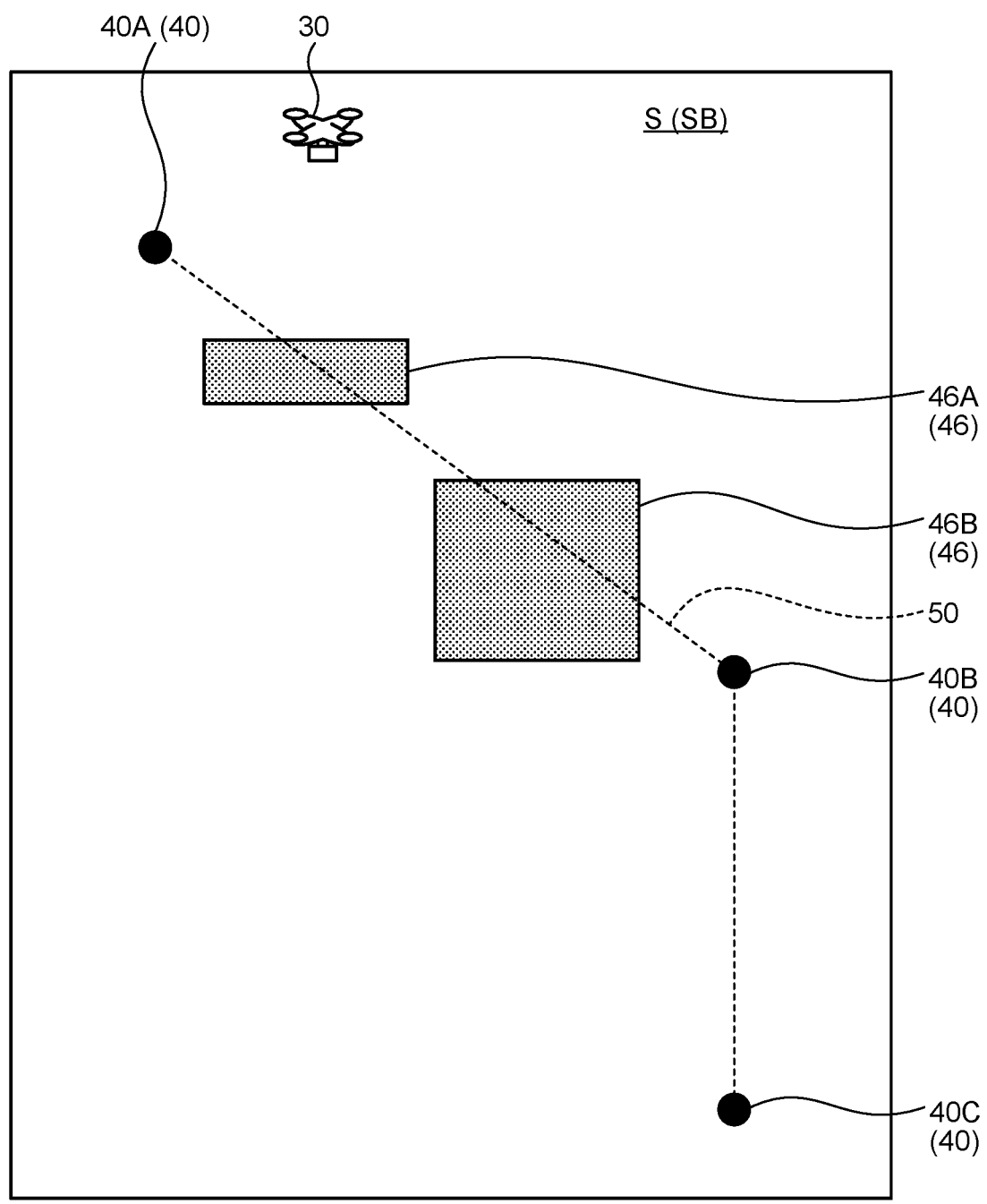
FIG. 2 is an explanatory diagram of tentative route calculation.

FIG. 2 is an explanatory diagram illustrating a calculation example of a tentative route 50. In FIG. 2, as an example, a space S and a virtual space SB are illustrated as two-dimensional spaces. In reality, the space S and the virtual space SB are three-dimensional spaces. In FIG. 2, obstacles 46A and 46B are illustrated as examples. The obstacle 46A and the obstacle 46B are examples of the obstacle 46 disposed in a moving target area of the mobile body 30. Furthermore, FIG. 2 also illustrates a tour point 40A, a tour point 40B and a tour point 40C as examples of a tour point 40.

The tentative route calculation module 20A calculates a tentative route 50 that passes through a plurality of tour points 40 disposed in the virtual space SB acquired by removing the obstacle 46 from the space S including the obstacle 46 that is the moving target area of the mobile body 30.

The tentative route 50 is expressed by a graph formed with the tour points 40 and edges connecting the tour points 40. The tentative route calculation module 20A generates a graph having the tour points 40 as nodes in the virtual space SB assumed to include no obstacle 46, and calculates a node sequence connecting the tour point 40 at the start point (for example, the tour point 40A) to the tour point 40 at the goal point (for example, the tour point 40C) to calculate the tentative route 50.

In the present embodiment, the tentative route calculation module 20A calculates a tour route that passes through the tour points 40 at least once as the tentative route 50. In other words, the tentative route calculation module 20A calculates the tentative route 50 that is drawn to go through the tour points 40 in a single stroke. That is, in the present embodiment, the tentative route calculation module 20A calculates the tentative route 50 by solving Traveling Salesman Problem (TSP). Any algorithms may be used to solve TSP. The tentative route calculation module 20A solves TSP using a cost that is the length of the edge between the tour points 40. Therefore, the tentative route calculation module 20A according to the present embodiment includes a cost calculation module. Note that other indicators regarding movement may be added to the cost, such as a posture change amount of the mobile body when moving between the tour points, a movement amount in up and down directions, and the like.

Figure 3:
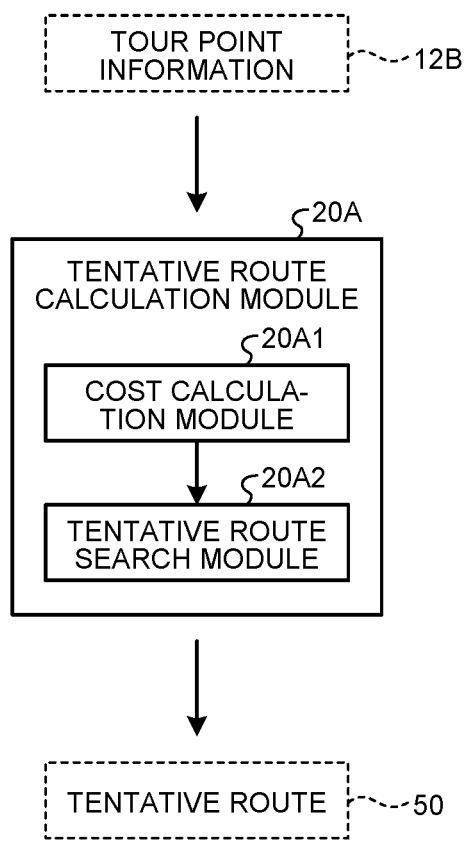
FIG. 3 is a schematic diagram illustrating a configuration of a tentative route calculation module.

FIG. 3 is a schematic diagram illustrating a configuration example of the tentative route calculation module 20A. In the present embodiment, the tentative route calculation module 20A includes a cost calculation module 20A1 and a tentative route search module 20A2.

The cost calculation module 20A1 calculates the cost between the tour points 40 disposed in the virtual space SB from which the obstacle 46 is removed. The cost calculation module 20A1 calculates a cost by using the length of the edge between the tour points 40. That is, the cost calculation module 20A1 calculates a cost for each of the edges connecting the nodes that are the tour points 40.

The tentative route search module 20A2 searches for the edge having the minimum cost so as to search for the tentative route 50 that is formed with the tour points 40 and the edge of the minimum cost that connects the tour points 40.

Note that the cost calculation module 20A1 is preferable to calculate a cost with a straight edge. That is, the tentative route calculation module 20A including the cost calculation module 20A1 is preferable to calculate the tentative route 50 formed with the tour points 40 and a straight line connecting the tour points 40.

With TSP, a graph is generated in which a node is connected all of the other nodes except itself. Therefore, the number of edges increases exponentially as the number of nodes increases. When the mobile body 30 is holonomic, the mobile body 30, after reaching one tour point 40, can move to a next tour point 40 by turning sharply, that is, discontinuously. Therefore, by making the edges connecting the tour points 40 included in the tentative route 50 straight, it is possible to generate the tentative route 50 that can be preferably applied to the holonomic mobile body 30.

In addition, by allowing the cost calculation module 20A1 to calculate the cost of the straightened edges, it is possible to shorten the calculation time required for calculating the cost of each edge. That is, the tentative route calculation module 20A can shorten the calculation time required for calculating the tentative route 50 by calculating the tentative route 50 with the straightened edges.

The tentative route calculation module 20A calculates the tentative route 50 that passes through the tour points 40 disposed in the virtual space SB from which the obstacle 46 is removed. When there is no obstacle 46, it is not necessary to do searching for detouring the obstacle 46, and the edges connecting the tour points 40 are always straight. Therefore, the tentative route calculation module 20A only needs to calculate an equation for the straight line connecting the tour points 40, which results in shortening the calculation time required for calculating the tentative route 50.

Returning to FIG. 1, the explanations will be continued. The via point addition module 20B derives a route with one or more via points added around the interference point between the obstacle 46 and the tentative route 50 in the space S including the obstacle 46 that is the moving target area of the mobile body 30, with a calculation accuracy corresponding to the precision of the route point calculation.

The via point addition module 20B calculates the one or more via points with a lower accuracy as the precision is lower. Furthermore, the via point addition module 20B calculates the one or more via points with a higher accuracy as the precision is higher.

Figure 4:
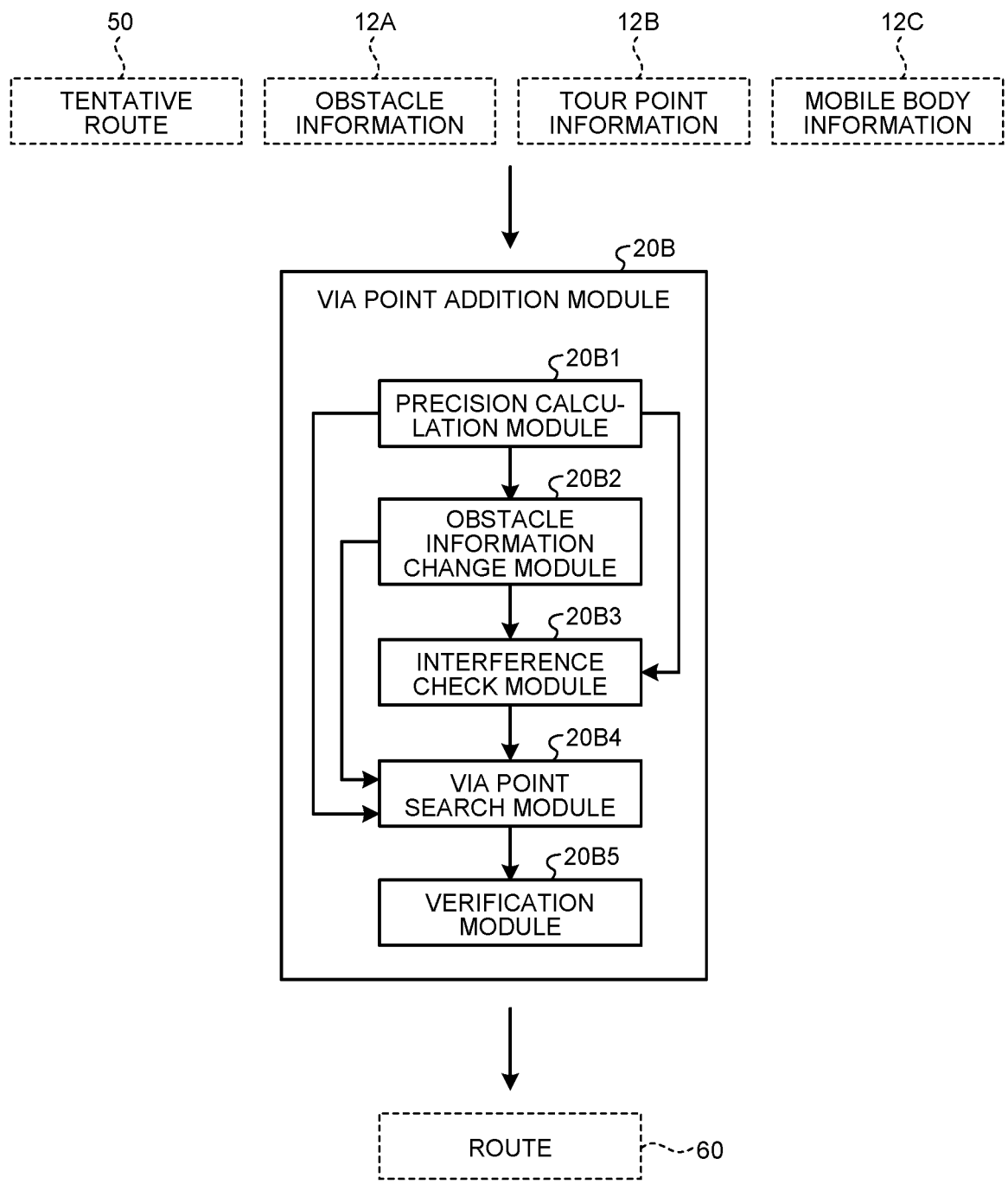
FIG. 4 is a functional block diagram of a via point addition module.

FIG. 4 is a functional block diagram illustrating an example of the via point addition module 20B.

The via point addition module 20B includes a precision calculation module 20B1, an obstacle information change module 20B2, an interference check module 20B3, a via point search module 20B4, and a verification module 20B5. The via point addition module 20B may simply need to be configured with at least the precision calculation module 20B1 and the via point search module 20B4, and may be configured without at least one of the obstacle information change module 20B2, the interference check module 20B3, and the verification module 20B5.

The precision calculation module 20B1 calculates the precision. Precision is the information indicating the degree of precision of the via point calculation. The precision calculation module 20B1 calculates the precision based on at least one of the collision severity $m_{col}'$ of the obstacle 46 and the obstacle avoidance performance $m_{obs}$ of the mobile body 30 to be lower as the collision severity $m_{col}'$ is lower and to be lower as the obstacle avoidance performance $m_{obs}$ is higher. In other words, the precision calculation module 20B1 calculates the precision to be higher as the collision severity $m_{col}'$ is higher and to be higher as the obstacle avoidance performance $m_{obs}$ is lower.

In detail, the precision calculation module 20B1 calculates the precision by using following equations (2) and (3).

$$p1 = k_{obs} \frac{1}{m_{obs} + \varepsilon} \quad (2)$$

$$p2 = p1 + k_{col} m_{col} \quad (3)$$

In equations (2) and (3), p1 represents the first precision. Note that p2 represents the second precision. Also, $k_{obs}$ and $k_{col}$ represent gains. Furthermore, $\varepsilon$ is a minute number to prevent division by zero. In addition, $m_{col}$ represents the collision severity $m_{col}'$. Also, $m_{obs}$ represents the obstacle avoidance performance $m_{obs}$. In the explanations hereinafter, the first precision may be referred to as the first precision p1 and the second precision may be referred to as the second precision p2.

The first precision p1 and the second precision p2 are examples of a precision p.

The first precision p1 is the precision p defined by the obstacle avoidance performance $m_{obs}$. As indicated in equation (2), the first precision p1 takes a higher value as the obstacle avoidance performance $m_{obs}$ is lower. Furthermore, the first precision p1 takes a lower value as the obstacle avoidance performance $m_{obs}$ is higher.

The second precision p2 is the precision p defined by the collision severity $m_{col}'$ and the obstacle avoidance performance $m_{obs}$. As indicated in equation (3), the second precision p2 takes a lower value as the obstacle avoidance performance $m_{obs}$ is higher, and takes a lower value as the collision severity $m_{col}'$ is lower. Furthermore, the second precision p2 takes a higher value as the obstacle avoidance performance $m_{obs}$ is lower, and takes a higher value as the collision severity $m_{col}'$ is higher.

The precision calculation module 20B1 calculates the first precision p1 by using the obstacle avoidance performance $m_{obs}$ included in the mobile body information 12C and equation (2) described above. Furthermore, the precision calculation module 20B1 calculates the second precision p2 for each element by using the collision severity $m_{col}'$ of each of the elements configuring the obstacle 46 included in the obstacle information 12A and the calculated first precision p1.

The precision calculation module 20B1 outputs the precision p including the calculated first precision p1 and second precision p2 to the obstacle information change module 20B2, the interference check module 20B3, and the via point search module 20B4.

The obstacle information change module 20B2 changes the density of a group of elements in the obstacle information 12A of the obstacle 46 that is expressed by the group elements to a lower density as the precision p is lower. In the present embodiment, the obstacle information change module 20B2 changes the density of the group of elements to a lower density as the second precision p2 is lower. The reason is that it is necessary to find a route not colliding, that is, not interfering with the obstacle 46 more strictly as the obstacle avoidance performance $m_{obs}$ of the mobile body 30 is lower.

Figure 5A:
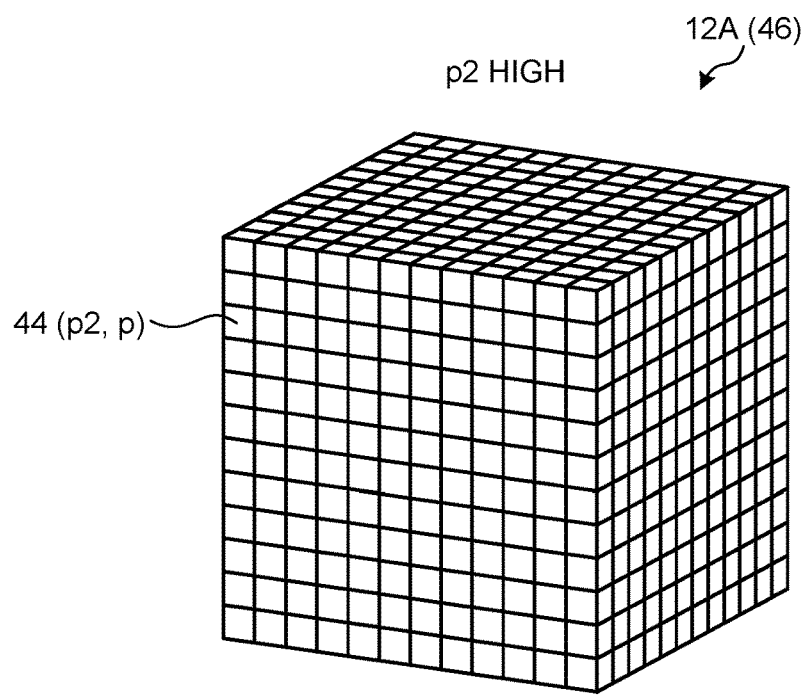
FIG. 5A is an explanatory diagram illustrating a change in obstacle information.
Figure 5B:
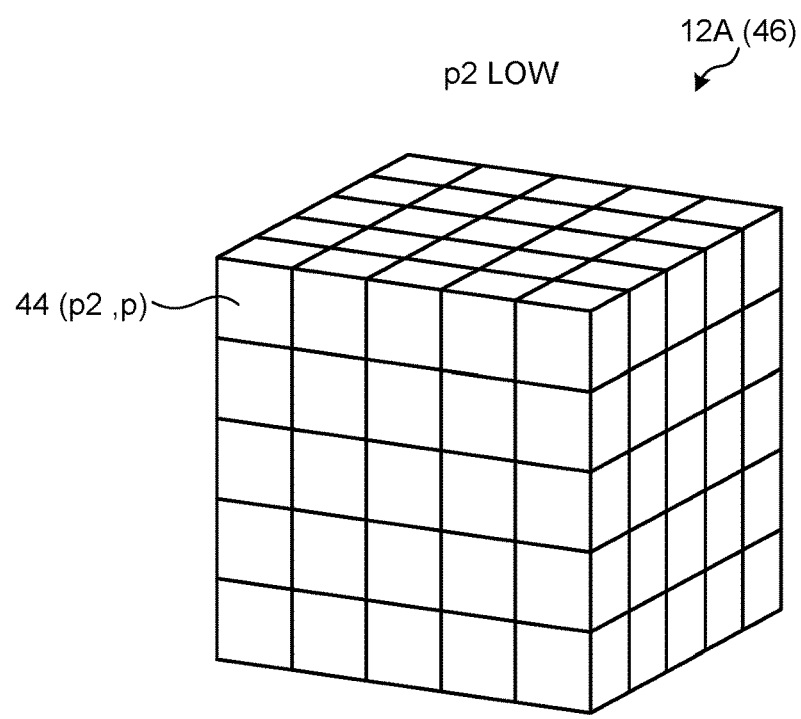
FIG. 5B is an explanatory diagram illustrating a change in obstacle information.

FIGS. 5A and 5B are explanatory diagrams illustrating examples of a change in the obstacle information 12A. FIG. 5A illustrates an example of the density of a group of elements 44 when the second precision p2 is high. FIG. 5B illustrates an example of the density of a group of elements 44 when the second precision p2 is low.

As described above, the obstacle information 12A is the information that expresses the obstacle 46 by a group of the elements 44 such as a group of points, a group of voxels each being a unit of a regular grid in a three-dimensional space, a group of polygons each being a basic polygonal shape when an obstacle is modeled as a polyhedron, and the like. FIGS. 5A and 5B illustrate examples of a case where the group of the elements 44 is a group of voxels.

For example, it is assumed that the density of the group of the elements 44 indicated by the obstacle information 12A acquired from the storage 12 is the density illustrated in FIG. 5A.

When the second precision p2 is the low precision p that is equal to or lower than a threshold, for example, the obstacle information change module 20B2 changes the obstacle information 12A to the obstacle information 12A in which the density of the group of the elements 44 is lowered.

For example, the obstacle information change module 20B2 generates the obstacle information 12A in which the density of the group of the elements 44 illustrated in FIG. 5A is changed to the group of the elements 44 with a lower density illustrated in FIG. 5B by increasing the size of the voxels that are the elements 44 indicated by the obstacle information 12A read out from the storage 12. That is, FIGS. 5A and 5B illustrate a scene of changing the density of the group of the elements 44 by changing the size of the voxels as an example.

Note that the obstacle information change module 20B2 may generate the obstacle information 12A changed to the group of the elements 44 with a still lower density by thinning out the voxels that are the elements 44 indicated by the obstacle information 12A read out from the storage 12.

Furthermore, the obstacle information change module 20B2 may calculate the obstacle information 12A of the group of the elements 44 with a lower density as the second precision p2 is lower, by using a function or the like that derives the group of the elements 44 with a lower density as the second precision p2 becomes lower.

Figure 6A:
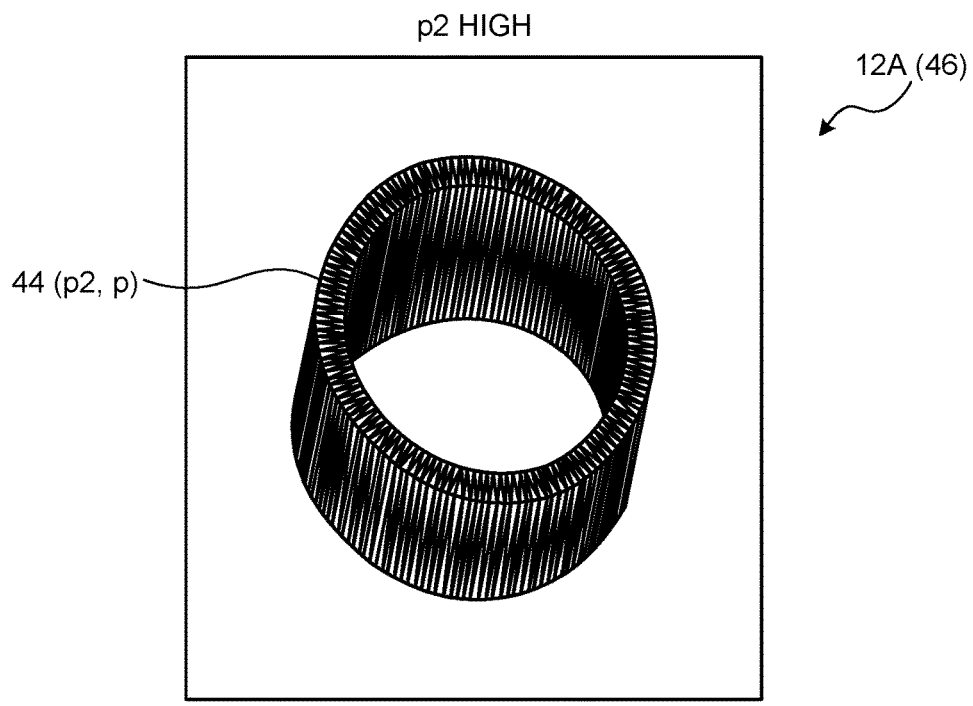
FIG. 6A is an explanatory diagram illustrating a change in obstacle information.
Figure 6B:
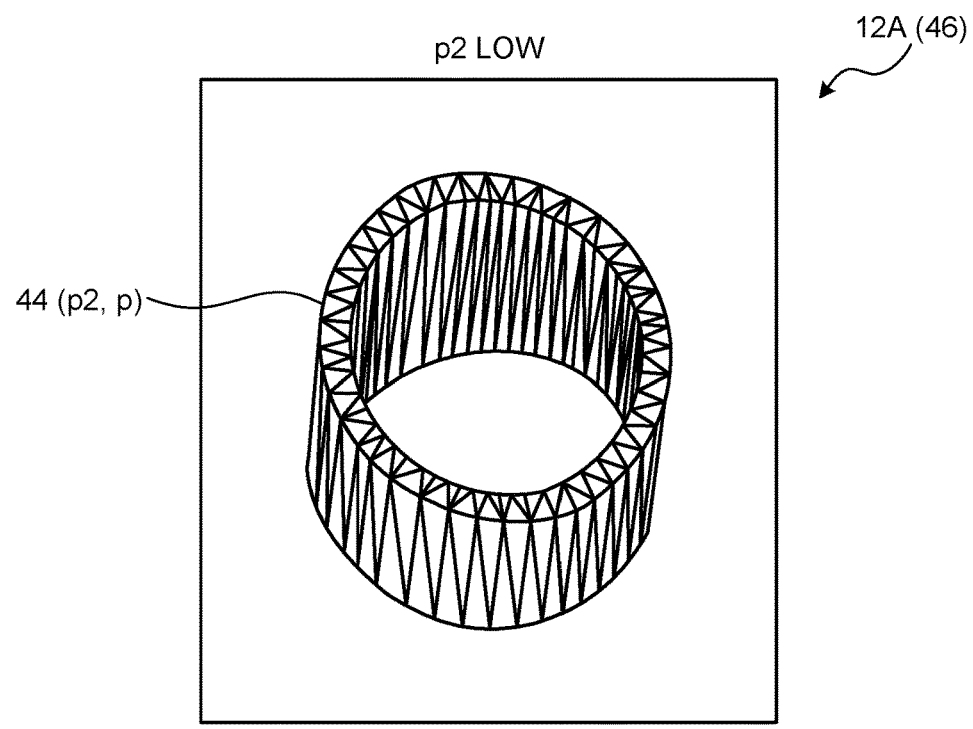
FIG. 6B is an explanatory diagram illustrating a change in obstacle information.

FIGS. 6A and 6B are explanatory diagrams illustrating examples of a change in the obstacle information 12A. FIG. 6A illustrates an example of the density of a group of the elements 44 when the second precision p2 is high. FIG. 6B illustrates an example of the density of a group of the elements 44 when the second precision p2 is low. FIGS. 6A and 6B illustrate examples of a case where the group of the elements 44 is a group of polygons.

For example, it is assumed that the density of the group of the elements 44 indicated by the obstacle information 12A acquired from the storage 12 is the density illustrated in FIG. 6A.

When the second precision p2 is the low precision p that is equal to or lower than a threshold, for example, the obstacle information change module 20B2 changes the obstacle information 12A to the obstacle information 12A in which the density of the group of the elements 44 is lowered. For example, the obstacle information change module 20B2 generates the obstacle information 12A in which the density of the group of the elements 44 illustrated in FIG. 6A is changed to the group of the elements 44 with a lower density illustrated in FIG. 6B by increasing the size of the polygons that are the elements 44 indicated by the obstacle information 12A read out from the storage 12. That is, FIGS. 6A and 6B illustrate a scene of changing the density of the group of the elements 44 by changing the size of the polygons as an example.

Note that the obstacle information change module 20B2 may generate the obstacle information 12A changed to the group of the elements 44 with still lower density by thinning out the polygons that are the elements 44 indicated by the obstacle information 12A read out from the storage 12.

Similarly, for the case where the group of the elements 44 is a point group, the obstacle information change module 20B2 may change the obstacle information 12A to be the group of the elements 44 with a higher density as the second precision p2 is higher and to be the group of the elements 44 with a lower density as the second precision p2 is lower.

By having the obstacle information change module 20B2 change the density of the group of the elements 44 in the obstacle information 12A to be a lower density as the second precision p2 is lower, the interference check module 20B3 to be described later can reduce the number of repetitions of collision checks, thereby making it possible to shorten the calculation time.

In detail, by having the obstacle information change module 20B2 thin out the polygons, voxels, or points that are the elements 44 expressed by the obstacle information 12A read from the storage 12 more as the second precision p2 becomes lower, the interference check module 20B3 to be described later can reduce the number of the elements 44 that are the target of interference checking. Therefore, it is possible to shorten the calculation time of the interference check module 20B3 by performing the changing processing of the obstacle information 12A according to the second precision p2 by the obstacle information change module 20B2.

Furthermore, by having the obstacle information change module 20B2 enlarge the size of the polygons or voxels that are the elements 44 expressed by the obstacle information 12A read from the storage 12 more as the second precision p2 becomes lower, the interference check module 20B3 to be described later can reduce the number of the elements 44 that are the target of interference checking. Therefore, it is possible to shorten the calculation time of the interference check module 20B3 by performing the changing processing of the obstacle information 12A according to the second precision p2 by the obstacle information change module 20B2.

The obstacle information change module 20B2 is preferable to adjust the size of the enlarged polygons or voxels such that the size of a single polygon or a single voxel after being enlarged becomes less than the overall circumscribed size of a single obstacle 46. By adjusting the size of a single polygon or a single voxel after being enlarged to be less than the overall circumscribed size of a single obstacle 46, it is possible to suppress deterioration in the interference checking performance of the interference check module 20B3 to be described later.

Furthermore, the obstacle information change module 20B2 changes the density of the group of the elements 44 in the obstacle information 12A to be a lower density as the second precision p2 becomes lower, that is, as the obstacle avoidance performance $m_{obs}$ becomes higher. The higher the obstacle avoidance performance $m_{obs}$ of the mobile body 30 is, the higher the performance thereof in moving by avoiding the obstacle 46. Therefore, the obstacle information change module 20B2 can derive the obstacle information 12A that can suppress collisions with the obstacle 46 and shorten the calculation time of the interference check module 20B3 to be described later.

Furthermore, the obstacle information change module 20B2 changes the density of the group of the elements 44 in the obstacle information 12A to be a higher density as the second precision p2 becomes higher, that is, as the obstacle avoidance performance $m_{obs}$ becomes lower.

Therefore, the obstacle information change module 20B2 can derive the obstacle information 12A that can check the interference with a high accuracy by the interference check module 20B3 to be described later according to the obstacle avoidance performance $m_{obs}$ of the mobile body 30.

Next, the interference check module 20B3 will be described. The interference check module 20B3 identifies interference points between the tentative route 50 and the obstacle 46.

Figure 7:
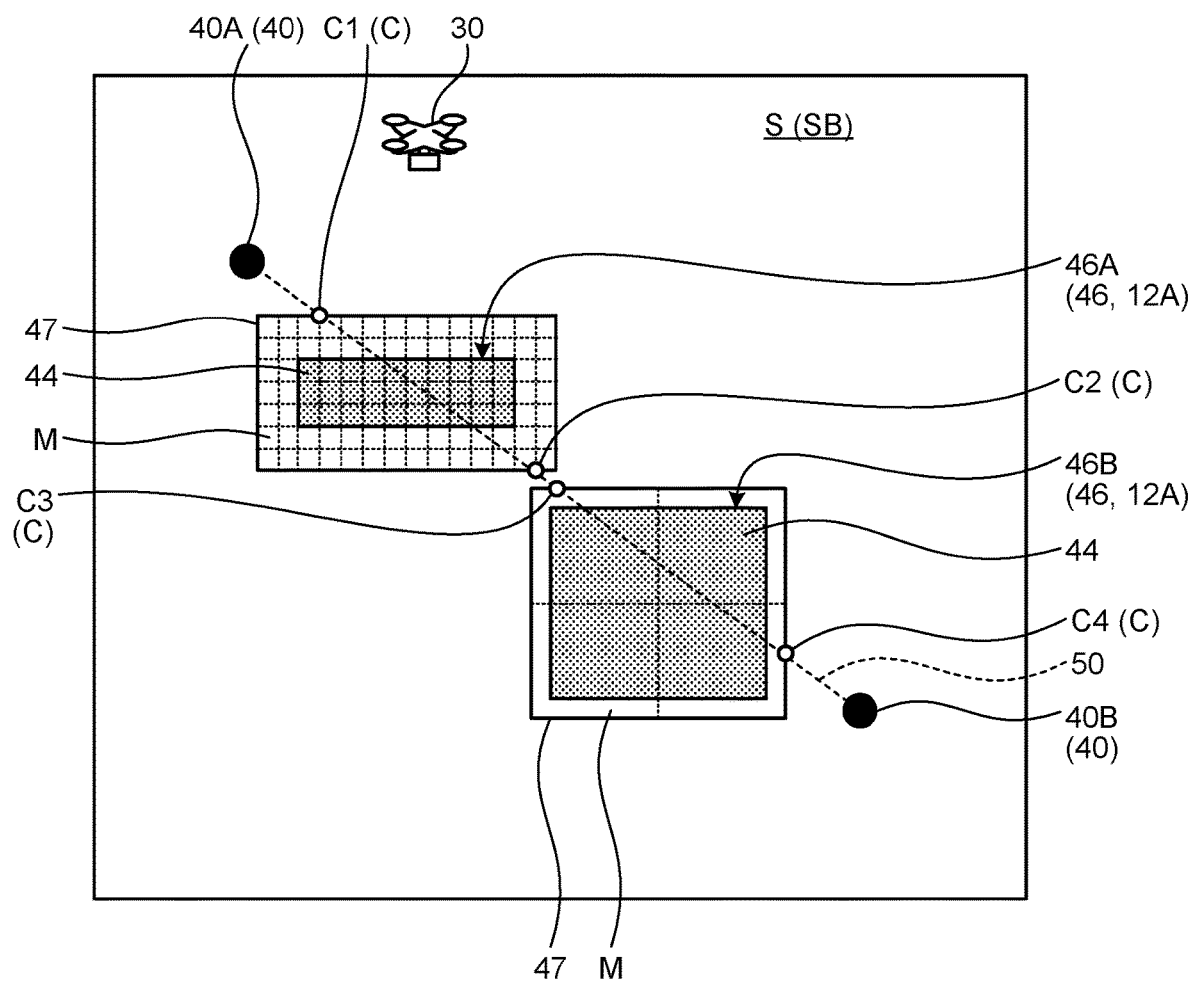
FIG. 7 is an explanatory diagram illustrating interference point identification.

FIG. 7 is an explanatory diagram illustrating an example when identifying an interference point C by the interference check module 20B3. In FIG. 7, the tentative route 50 and the tour point 40C not interfering with each other are omitted in order to focus on the interference area. In FIG. 7, as an example, the space S and the virtual space SB are illustrated as two-dimensional spaces. In reality, the space S and the virtual space SB are three-dimensional spaces.

The interference check module 20B3 receives the tentative route 50 from the tentative route calculation module 20A. Furthermore, the interference check module 20B3 receives, from the obstacle information change module 20B2, the obstacle information 12A that is changed in the obstacle information change module 20B2. When the obstacle information 12A is not changed in the obstacle information change module 20B2, the interference check module 20B3 may simply receive the unchanged obstacle information 12A from the obstacle information change module 20B2. The interference check module 20B3 checks the interference between the obstacle 46 indicated in the received obstacle information 12A and the tentative route 50, and identifies the interfering interference point C.

When the group of the elements 44 indicated in the obstacle information 12A is a group of points, the interference check module 20B3 converts it to a group of voxels or polygons, and checks interference thereof with the tentative route 50.

For each of the elements 44 expressed in the obstacle information 12A, the interference check module 20B3 checks an intersection with a line segment represented by the tentative route 50 to check the interference between the tentative route 50 and the obstacle 46. In detail, for each of the elements 44 expressed by a group of voxels or a group of polygons, the interference check module 20B3 checks the interference between the face of the voxel or polygon that is the element 44 and the tentative route 50 to identify the interference point C. Then, the interference check module 20B3 outputs, as interference point information, the position coordinates of the interfering interference point C and the identification information of the tour points 40 disposed at both ends of the edge where the interference point C exists.

Note that the interference check module 20B3 may identify the interference point C between the tentative route 50 and an obstacle area 47 in which a wider margin area M is added around the obstacle 46 as the precision p is higher.

In detail, the interference check module 20B3 sets the obstacle area 47 in which a wider margin area M is added around the obstacle 46 as the second precision p2 becomes higher.

FIG. 7 illustrates, as an example, the obstacle 46A indicated by the obstacle information 12A with the high second precision p2 and a high density of the group of the elements 44, and the obstacle 46B indicated by the obstacle information 12A with the low second precision p2 and a low density of the group of the elements 44. In this case, the interference check module 20B3 sets the obstacle area 47 with the wider margin area M for the obstacle 46A, and sets the obstacle area 47 with the narrower margin area M for obstacle 46B.

Then, the interference check module 20B3 checks the intersection of the obstacle area 47 with the tentative route 50 for each of the elements 44 of each of the obstacles 46A and 46B disposed in the space S. In the example illustrated in FIG. 7, the second precision p2 of each of the elements 44 of the obstacle 46A is higher than the second precision p2 of each of the elements 44 of the obstacle 46B. That is, the density of the group of the elements 44 indicated by the obstacle information 12A of the obstacle 46A is higher than the density of the group of the elements 44 indicated by the obstacle information 12A of the obstacle 46B. Therefore, also for the margin area M, the interference check module 20B3 may simply check the intersection with the tentative route 50 for each of the elements 44 in a density that matches the density of the group of the elements 44 indicated by the obstacle information 12A of the obstacle 46 including the margin area M.

In the example illustrated in FIG. 7, for example, the interference check module 20B3 identifies an interference point C1, an interference point C2, an interference point C3, and an interference point C4 as interference points C. Then, the interference check module 20B3 outputs the interference point information that includes each of those interference points C and identification information of each of the tour point 40A and the tour point 40B, which are the tour points 40 at both ends of each of the edges that include each of the interference points C.

In detail, for example, the interference check module 20B3 outputs the interference point information that includes the interference point C1 and the identification information of each of the tour point 40A and the tour point 40B, which are the tour points 40 at both ends of the edges including the interference point C1 on the tentative route 50. Furthermore, the interference check module 20B3 outputs the interference point information that includes the interference point C2 and the identification information of each of the tour point 40A and the tour point 40B, which are the tour points 40 at both ends of the edges including the interference point C2 on the tentative route 50. Furthermore, the interference check module 20B3 outputs the interference point information that includes the interference point C3 and the identification information of each of the tour point 40A and the tour point 40B, which are the tour points 40 at both ends of the edges including the interference point C3 on the tentative route 50. Furthermore, the interference check module 20B3 outputs the interference point information that includes the interference point C4 and the identification information of each of the tour point 40A and the tour point 40B, which are the tour points 40 at both ends of the edges including the interference point C4 on the tentative route 50.

The interference check module 20B3 checks the intersection of the obstacle area 47 with the tentative route 50 for each of the elements 44 of each of the obstacles 46A and 46B disposed in the space S. The density of the group of the elements 44 is the density changed by the obstacle information change module 20B2 according to the second precision p2. Therefore, the interference check module 20B3 can check the intersection of the obstacle area 47 with the tentative route 50 with a calculation accuracy corresponding to the precision p by checking the intersection of each of the elements 44 with the tentative route 50.

Furthermore, the density of the group of elements 44 indicated by the obstacle information 12A of the obstacle 46B is changed to be lower than the density of the group of the elements 44 indicated by the obstacle information 12A of the obstacle 46A according to the second precision p2. Therefore, the interference check module 20B3 can shorten the calculation time required for checking the interference by checking the interference with the tentative route 50 for each of the elements 44 indicated in the obstacle information 12A that is changed according to the second precision p2.

Furthermore, the interference check module 20B3 sets the obstacle area 47 in which the wider margin area M is added around the obstacle 46 as the second precision p2 becomes higher. Having the higher second precision p2 means that at least one of the observation accuracy of the mobile body 30 and the positioning accuracy of the mobile body 30 is low. The interference check module 20B3 can identify the interference point C with a higher accuracy according to the obstacle avoidance performance $m_{obs}$ of the mobile body 30 by adding the wider margin area M around the obstacle 46 as the second precision p2 becomes higher.

Note that the minimum value of the margin area M may be defined to be the size of the mobile body 30 included in the mobile body information 12C. By setting the minimum value of the margin area M to be the size of the mobile body 30, the interference check module 20B3 can check the interference between the tentative route 50 and the obstacle 46 with a higher accuracy.

Returning to FIG. 4, the explanations will be continued.

Next, the via point search module 20B4 will be described. The via point search module 20B4 searches the search space with a search accuracy corresponding to the precision p, and adds one or more via points around the interference point C. Then, the via point search module 20B4 derives a route by adding the one or more via points to the tentative route 50.

The via point search module 20B4 receives the tentative route 50 from the tentative route calculation module 20A. Furthermore, the interference check module 20B3 receives, from the obstacle information change module 20B2, the obstacle information 12A that is changed in the obstacle information change module 20B2. When the obstacle information 12A is not changed in the obstacle information change module 20B2, the via point search module 20B4 may simply receive the unchanged obstacle information 12A from the obstacle information change module 20B2. Furthermore, the via point search module 20B4 receives, from the interference check module 20B3, the interference point information including the interference point C and the identification information of each of the tour points 40 at both ends of the edge including the interference point C on the tentative route 50. In addition, the via point search module 20B4 receives the precision p from the precision calculation module 20B1.

The via point search module 20B4 searches the search space by using the tentative route 50, the obstacle information 12A, the interference point information, and the precision p, and adds the one or more via points. Then, the via point search module 20B4 derives a route 60 by adding the one or more via points to the tentative route 50. A series of processing performed by the via point search module 20B4 for searching the search space, adding the via points, and deriving the route 60 may be referred and described as route derivation processing.

Figure 8A:
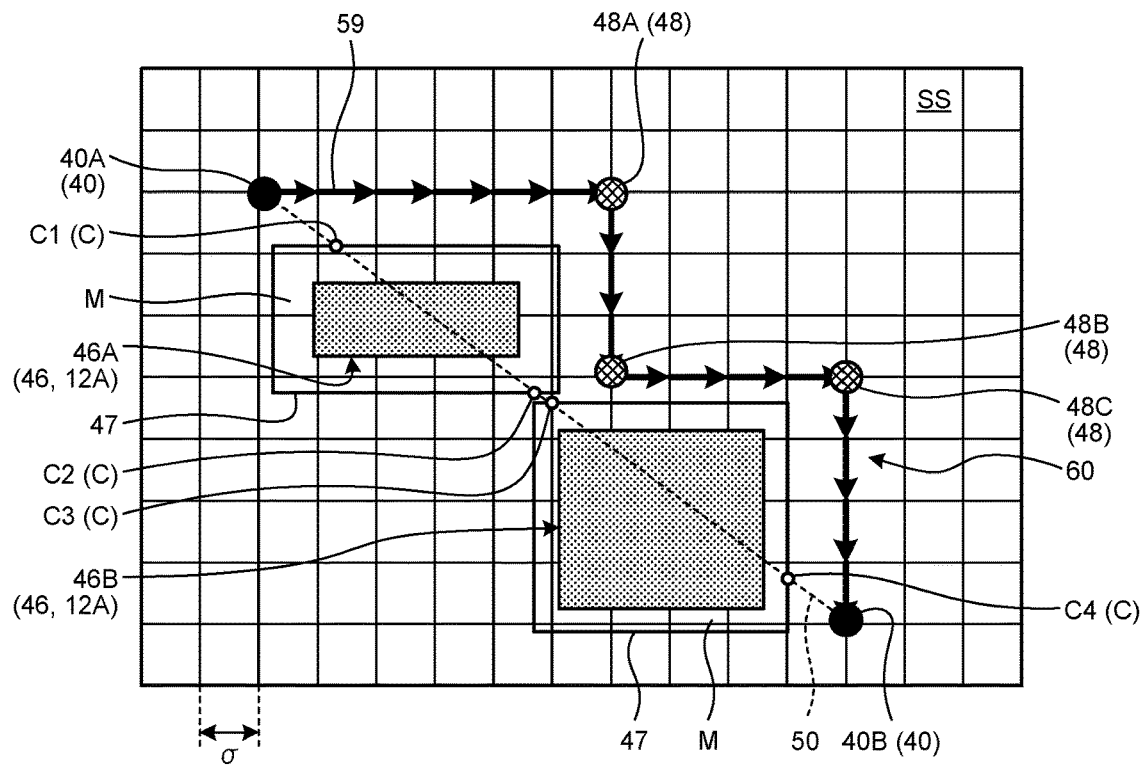
FIG. 8A is an explanatory diagram illustrating route derivation processing.
Figure 8B:
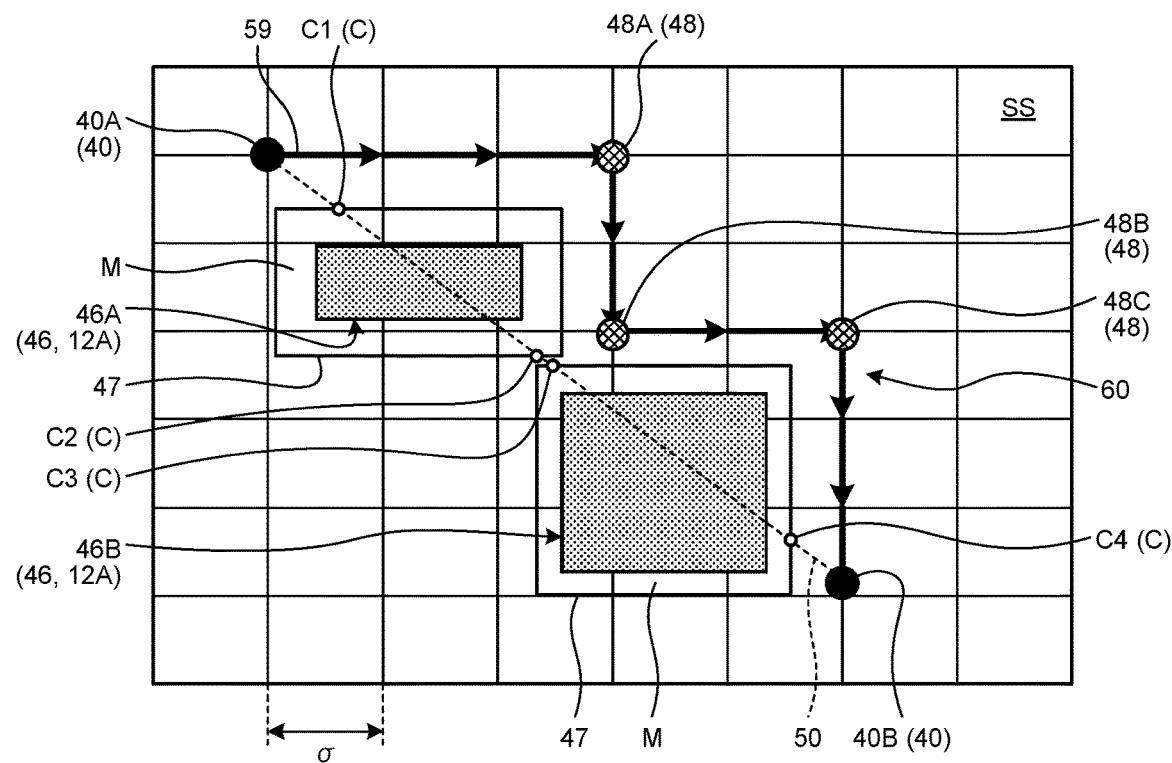
FIG. 8B is an explanatory diagram illustrating route derivation processing.

FIGS. 8A and 8B are explanatory diagrams illustrating examples of the route derivation processing performed by the via point search module 20B4. FIG. 8A is an explanatory diagram illustrating an example of a case where the first precision p1 is high. FIG. 8B is an explanatory diagram illustrating an example of a case where the first precision p1 is low. The high first precision p1 means that the first precision p1 is equal to or more than a threshold determined in advance. The low first precision p1 means that the first precision p1 is less than the threshold.

The via point search module 20B4 searches a search space SS. Algorithms such as Rapidly exploring random tree (RRT), A-star (A*), and Dijkstra's algorithm may be used for the search methods. These search methods dispose search points in a grid form or randomly in the search space SS, and search the search space SS for each of the search points. FIGS. 8A and 8B illustrate a series of search points arranged in a grid form as an example.

The via point search module 20B4 sets a search interval a to be longer as the first precision p1 is lower. In addition, the via point search module 20B4 sets the search interval a to be shorter as the first precision p1 is higher. Therefore, as illustrated in FIG. 8A, when the first precision p1 is high, the via point search module 20B4 sets the search interval a to be shorter than when the first precision p1 is low. On the other hand, as shown in FIG. 8B, when the first precision p1 is low, the via point search module 20B4 sets the search interval a to be longer than when the first precision p1 is high.

Then, the via point search module 20B4 searches the search space SS for each search point at the search interval a set according to the first precision p1, from the tour point 40A at the start point toward the tour point 40B at the goal point. At this time, the via point search module 20B4 searches the search space SS for each search point at the set search interval a such that the cost expressed by the distance from the tentative route 50 is lower and that the interference point C and the obstacle area 47 indicated by the interference point information are not interfered (see arrow 59). The via point search module 20B4 may use the obstacle area 47 that is set up in the similar manner as that of the interference check module 20B3. Note that the via point search module 20B4 may narrow the search range by searching the search space SS by having a search point in the surroundings of the first interference point C (for example, the interference point C1) between the tentative route 50 and the obstacle 46 as the start point.

Then, the via point search module 20B4 adds one or more via points 48 to the search points that are searched at each search interval σ such that the cost expressed by the distance from the tentative route 50 is lower and that the interference point C and the obstacle area 47 indicated by the interference point information are not interfered. Note that the via point search module 20B4 may selectively add the via point 48 to the search point where the search direction is changed.

For example, in the case of the example illustrated in FIG. 8A with the high first precision p1, the via point search module 20B4 searches for the search point that satisfies the above condition for each search interval σ narrower than the search interval σ of the low first precision p1 illustrated in FIG. 8B, and adds a via point 48A, a via point 48B, and a via point 48C as the via points 48.

Furthermore, in the case of the example illustrated in FIG. 8B with the low first precision p1, the via point search module 20B4 searches for the search point that satisfies the above condition for each search interval σ wider than the search interval σ of the high first precision p1 illustrated in FIG. 8A, and adds the via point 48A, the via point 48B, and the via point 48C as the via points 48.

Note that the via points 48 and the search directions illustrated in FIGS. 8A and 8B are examples, and are not limited to the mode illustrated in FIGS. 8A and 8B.

Furthermore, FIGS. 8A and 8B illustrate, as an example, the case where each of the intersection points of a search grid at the search interval σ is the search point. However, the search point may also be a position between the intersections (vertices) of each of the four sides configuring the search grid.

As described, the via point search module 20B4 disposes the search points in the search space SS, and searches the search space SS for each of the search points. That is, the via point search module 20B4 does not search the area between the previous search point and the current search point. Therefore, the via point search module 20B4 can shorten the search time.

Furthermore, the via point search module 20B4 sets the search interval σ to be longer as the first precision p1 becomes lower, and searches the search space SS for each of the search points at the search interval a. Therefore, the via point search module 20B4 can search the search space SS with a coarser search accuracy as the first precision p1 is lower, and add the via points 48. As a result, the via point search module 20B4 can search the search space SS with the search accuracy corresponding to the precision p, thereby making it possible to shorten the search time.

Then, upon completing the search of the search space SS, the via point search module 20B4 adds the via points 48 to the tentative route 50 by inserting the via points 48 as the solution obtained by the search and the second precisions $p2i$ of each of the via points 48 to the tentative route 50.

In detail, the via point search module 20B4 inserts the identification of the via points 48 between the identification information of the tour points 40 disposed at both ends of the edges of the interference points C, which avoid interference by the via points 48, on the tentative route 50. For the identification information of the via points 48, information that can be identified as not being the identification information of the tour points 40 but being the identification information of the via points 48 may be used. For example, for the identification information of the via points 48, numbers with different number of digits with respect to the numbers of the identification information of the tour points 40 may be used.

Furthermore, the via point search module 20B4 gives, to the via points 48, the second precision p2 of the elements 44 at the interference points C in the obstacle 46 avoided by the via points 48, as the second precision $p2i$ of the via points 48. The via point search module 20B4 may give the linking information or the like capable of identifying the second precision $p2i$ to the via points 48.

The via point search module 20B4 derives the tentative route 50 with the added via points 48 as the route 60. Note that the via point search module 20B4 may derive, as the route 60, a graph formed with the tour points 40 included in the tentative route 50, the added via points 48, and edges connecting the points including the tour points 40 and the via points 48. In this case, the via point search module 20B4 can derive the route 60 that can be preferably applied to the holonomic mobile body 30 by calculating the route 60 with the straight edges connecting the points. Furthermore, in this case, the via point search module 20B4 can shorten the time required for deriving the route 60.

Returning to FIG. 4, the explanations will be continued. When the total length of the route 60 derived by the via point search module 20B4 is less than the length acquired by adding a threshold to the total length of the tentative route 50 used in calculation of the route 60, the verification module 20B5 identifies the route 60 as the output target route 60.

The route 60 derived by adding the via points 48 between the tour points 40 by the via point search module 20B4 may become the route 60 indicating an unnecessary detour due to the positions and the like of the tour points 40. The reason why the route 60 indicating an unnecessary detour is derived may be that connections between the points including the tour points 40 and the via points 48 are not appropriate.

Therefore, when the total length of the route 60 derived by the via point search module 20B4 is equal to or longer than the length acquired by adding the threshold to the total length of the tentative route 50 used in calculation of the route 60, the verification module 20B5 determines it as the route 60 indicating an unnecessary detour, and excludes the route 60 from the target to be output to the output control module 20C. Furthermore, when the total length of the route 60 derived by the via point search module 20B4 is less than the length acquired by adding the threshold to the total length of the tentative route 50 used in calculation of the route 60, the verification module 20B5 determines it as not being the route 60 indicating an unnecessary detour, and identifies the route 60 as the output target route 60. Then, the verification module 20B5 outputs the identified route 60 to the output control module 20C. The threshold used to calculate the added length may be defined in advance.

Returning to FIG. 1, the explanations will be continued. The via point addition module 20B may derive the route 60 to which the via points 48 are added by the route derivation processing described above, and may also derive the route 60 acquired by adding the input via points 48 to the tentative route 50.

For example, the via point addition module 20B displays the tentative route 50 calculated by the tentative route calculation module 20A and the obstacle 46 indicated by the obstacle information 12A on the display unit 14. The user sets the via points 48 at positions by avoiding interference with the obstacle 46 by operating the input unit 16 while viewing the tentative route 50 displayed on the display unit 14. The user may input the position coordinates of the via points 48 in the space S by operating the input unit 16. The user may also indicate the positions of the via points 48 on the display screen for the displayed tentative route 50 by operating the input unit 16. In this case, the via point addition module 20B may calculate the positions of the via points 48 in the space S from the relative positions of the via points 48 indicated for the tentative route 50 on the display screen.

Then, the interference check module 20B3 of the via point addition module 20B checks interference between the route 60, which is acquired by inserting the received via points 48 to the tentative route 50, with the obstacle 46 and, when there is interference, displays interference information indicating the interference on the display unit 14. The user may change the positions of the via points 48 by operating the input unit 16 while checking the interference information displayed on the display unit 14.

When the route 60 acquired by inserting the received or changed via points 48 to the tentative route 50 does not interfere with the obstacle 46, the via point addition module 20B may output the route 60 to the output control module 20C as the output target route 60.

By using the via points 48 received from the user in the via point addition module 20B, the route planning device 10 according to the present embodiment can be applied also to systems where the above route derivation processing is difficult to execute. For example, as described above, there may be a case where the total length of the route 60 derived by the via point search module 20B4 is equal to or longer than the added length, so that the verification module 20B5 determines that it is the route 60 indicating an unnecessary detour and excludes the route 60 from output target for the output control module 20C. In that case, it is possible to derive the output target route 60 by using the via points 48 received from the user in the via point addition module 20B.

Next, the output control module 20C will be described.

The output control module 20C outputs the route 60 received from the via point addition module 20B. For example, the output control module 20C outputs the route 60 received from the via point addition module 20B to the mobile body 30 and the display unit 14.

Upon receiving the route 60 from the via point addition module 20B, the output control module 20C may output the route 60 to the mobile body 30 and the display unit 14. Furthermore, the output control module 20C may display the route 60 on the display unit 14 upon receiving an instruction to display the route 60 by an operation instruction or the like of the user via the input unit 16. Also, the output control module 20C may transmit the route 60 to the mobile body 30 via the communication unit 18 upon receiving an instruction to transmit the route 60 to the mobile body 30 by an operation instruction or the like of the user via the input unit 16. Furthermore, the output control module 20C may store the route 60 in the storage 12 or transmit it to an external information processing device via the communication unit 18 and a network.

Upon receiving the route 60, the mobile body 30 acquires the three-dimensional position coordinates of each of the tour points 40 and the via points 48 indicated on the route 60 and moves along the route 60 by sequentially moving to the positions indicated by the three-dimensional position coordinates. The route 60 may be information that includes the three-dimensional position coordinates of each of the tour points 40 and the via points 48. Furthermore, the route 60 may also include information indicating where the three-dimensional position coordinates of each of the tour points 40 and the via points 48 are stored. Furthermore, the route 60 may include information regarding at least one selected from the work content executed by the mobile body 30 at each of the tour points 40 and the via points 48, the stopped time at the points, the posture of the mobile body 30 at the points, and the position coordinates and the posture of the work target at the points. In this case, the via point addition module 20B may read out the information from the tour point information 12B and derive the route 60.

Upon receiving the route 60, the display unit 14 displays the received route 60. The output control module 20C is preferable to display the tour points 40 and the via points 48 included in the route 60 in different display modes on the display unit 14. By displaying the tour points 40 and the via points 48 in different display modes on the display unit 14, the tour points 40 and the via points 48 can be provided to the user in an easily identifiable manner.

For example, the output control module 20C displays, on the display unit 14, the tour points 40 and via points 48 included in the route 60 in display modes that are different in at least one of color, shape, and size. The output control module 20C may also display each of the tour points 40 on the display unit 14 in a display mode corresponding to the value of the second precision p2$i$ given to the tour points 40. The output control module 20C may also display the value of the second precision p2$i$ given to the via points 48 in the vicinity of the display area of the via points 48 indicating the second precision p2$i$. The output control module 20C may also acquire the second precision p2 of each of all elements 44 included in the search space SS, and display it at the corresponding positions on the display screen of the display unit 14. Furthermore, the output control module 20C may display the second precision p2 on the display screen in colors corresponding to the values of the second precision p2.

Also, upon receiving instruction information that includes at least one of an instruction to add an additional via point to the route 60 displayed on the display unit 14 and an instruction to change the positions of the via points 48 included in the route 60, the output control module 20C may change the route 60 based on the instruction information.

For example, the user operates the input unit 16 while viewing the route 60 displayed on the display unit 14 to perform operations such as changing the positions of the via points 48 included in the displayed route 60, adding an additional via point that is a new via point 48, and the like. For example, the positions of the via points 48 included in the displayed route 60 can be changed when the user performs a dragging operation or the like of a mouse as the input unit 16. Furthermore, the user may also change the connection relationship of the edges connecting the points including the tour points 40 and the via points 48 by operating the input unit 16.

Upon receiving the instruction information such as an instruction to add an additional via point to the route 60 displayed on the display unit 14, an instruction to change the positions of the via points 48 included in the route 60, and an instruction to change the connection relationship of the edges connecting the points, the output control module 20C changes the route 60 to be the route 60 that corresponds to the instruction information.

Therefore, the output control module 20C can change the route 60 derived by the via point addition module 20B to be the route 60 upon which the user's intention is reflected.

Next, an example of a flow of the information processing executed by the route planning device 10 according to the present embodiment will be described.

FIG. 9 is a flowchart illustrating an example of the flow of the information processing executed by the route planning device 10 according to the present embodiment.

The tentative route calculation module 20A calculates the tentative route 50 (step S100). The tentative route calculation module 20A calculates the tentative route 50 based on the tour point information 12B.

Then, the output control module 20C displays the tentative route 50 calculated at step S100 on the display unit 14 (step S102).

Thereafter, the precision calculation module 20B1 calculates the precision p (step S104). In the present embodiment, the precision calculation module 20B1 calculates the first precision p1 and the second precision p2.

The obstacle information change module 20B2 determines whether the mobile body 30 has the obstacle avoidance performance $m_{obs}$ (step S106). For example, the obstacle information change module 20B2 executes the determination of step S106 by determining whether the second precision p2 calculated at step S104 is the low precision p that is equal to or lower than the threshold.

When determined negative at step S106 (No at step S106), the processing proceeds to step S110 to be described later. When determined positive at step S106 (Yes at step S106), the processing proceeds to step S108.

At step S108, the obstacle information change module 20B2 changes the density of the group of the elements 44 indicated in the obstacle information 12A acquired from the storage 12 to a lower density as the second precision p2 calculated at step S104 is lower (step S108).

The interference check module 20B3 checks the interference between the tentative route 50 and the obstacle 46 by using the tentative route 50 calculated at step S100 and the obstacle information 12A changed at step S108 or the obstacle information 12A that is not changed because the determination at step S106 is negative (step S110). By the processing of step S110, the interference points C between the tentative route 50 and the obstacle 46 are identified, and the position coordinates of the interference points C and the identification information of the tour points 40 disposed at both ends of the edges where the interference points C exist are output as the interference point information.

The via point search module 20B4 searches the search space SS with the search accuracy corresponding to the precision p calculated at step S104, and adds the via points 48 around the interference points C (step S112). Then, the via point search module 20B4 derives the route 60 by adding the via points 48 to the tentative route 50.

The verification module 20B5 verifies the route 60 that is derived at step S112 (step S114). At step S114, when the total length of the route 60 derived at step S112 is less than the length acquired by adding the threshold to the total length of the tentative route 50 used in calculation of the route 60, the verification module 20B5 identifies the route 60 as the output target route 60.

Next, the output control module 20C determines whether the via points 48 are received from the input unit 16 by an operation instruction of the user via the input unit 16 (step S116). When determined negative at step S116 (No at step S116), the processing proceeds to step S118.

At step S118, the output control module 20C outputs the route 60 verified at step S114 or the route 60 determined negative at step S120 to be described later to the mobile body 30 and the display unit 14 (step S118). Then, the present routine is terminated.

In the meantime, when determined positive at step S116 (Yes at step S116), the processing proceeds to step S120. At step S120, the interference check module 20B3 of the via point addition module 20B determines whether the obstacle 46 interferes with the route 60 that is acquired by inserting the via points 48 received at step S116 to the tentative route 50 (step S120). When determined at step S120 that there is no interference (No at step S120), the processing proceeds to step S118 described above.

When determined at step S120 that there is interference (Yes at step S120), the processing proceeds to step S122.

At step S122, the output control module 20C displays the interference information indicating the interference on the display unit 14 (step S122). The user changes the positions of the via points 48 by operating the input unit 16 while checking the interference information displayed on the display unit 14.

The via point addition module 20B receives the change in the positions of the via points 48 from the input unit 16 (step S124). Then, returning to step S120, the interference check module 20B3 of the via point addition module 20B may determine whether the obstacle 46 interferes with the route 60 that is acquired by inserting the via points 48 changed at step S124 to the tentative route 50.

As described above, the route planning device 10 according to the present embodiment includes the tentative route calculation module 20A and the via point addition module 20B. The tentative route calculation module 20A calculates the tentative route 50 that passes through the tour points 40 disposed in the virtual space SB acquired by removing the obstacle 46 from the space S including the obstacle 46. The via point addition module 20B derives the route 60 with one or more via points 48 added around the interference points C between the obstacle 46 and the tentative route 50 included in the space S with the calculation accuracy corresponding to the precision p of the via point calculation.

Note here that the conventional technology always searches for the via points 48 with a high calculation accuracy in order to add the via points 48 that are necessarily not interfering with the obstacle 46, which may result in increasing the route calculation time.

On the contrary, the route planning device 10 according to the present embodiment derives the route 60 with one or more via points 48 added around the interference points C between the obstacle 46 and the tentative route 50 included in the space S with the calculation accuracy corresponding to the precision p.

As described, since the route planning device 10 according to the present embodiment can change the calculation accuracy of the precision p according to the precision p, it is possible to shorten the route calculation time compared to the case where the route 60 is always derived with a high calculation accuracy regardless of the precision p.

Therefore, the route planning device 10 according to the present embodiment can shorten the route calculation time.

Second Embodiment

The first embodiment has been described above by referring, as an example, to the mode that derives the route 60 by using the tentative route 50 of the lowest cost calculated by the tentative route calculation module 20A. The second embodiment will be described by referring to a mode that derives the route 60 for each of a plurality of tentative routes 50 calculated in the tentative route calculation module 20A, and determines the suboptimal route 60 from the derived routes 60.

In the present embodiment, same reference signs are applied to functions and components same as those of the first embodiment, and detailed explanations thereof are omitted.

Figure 10:
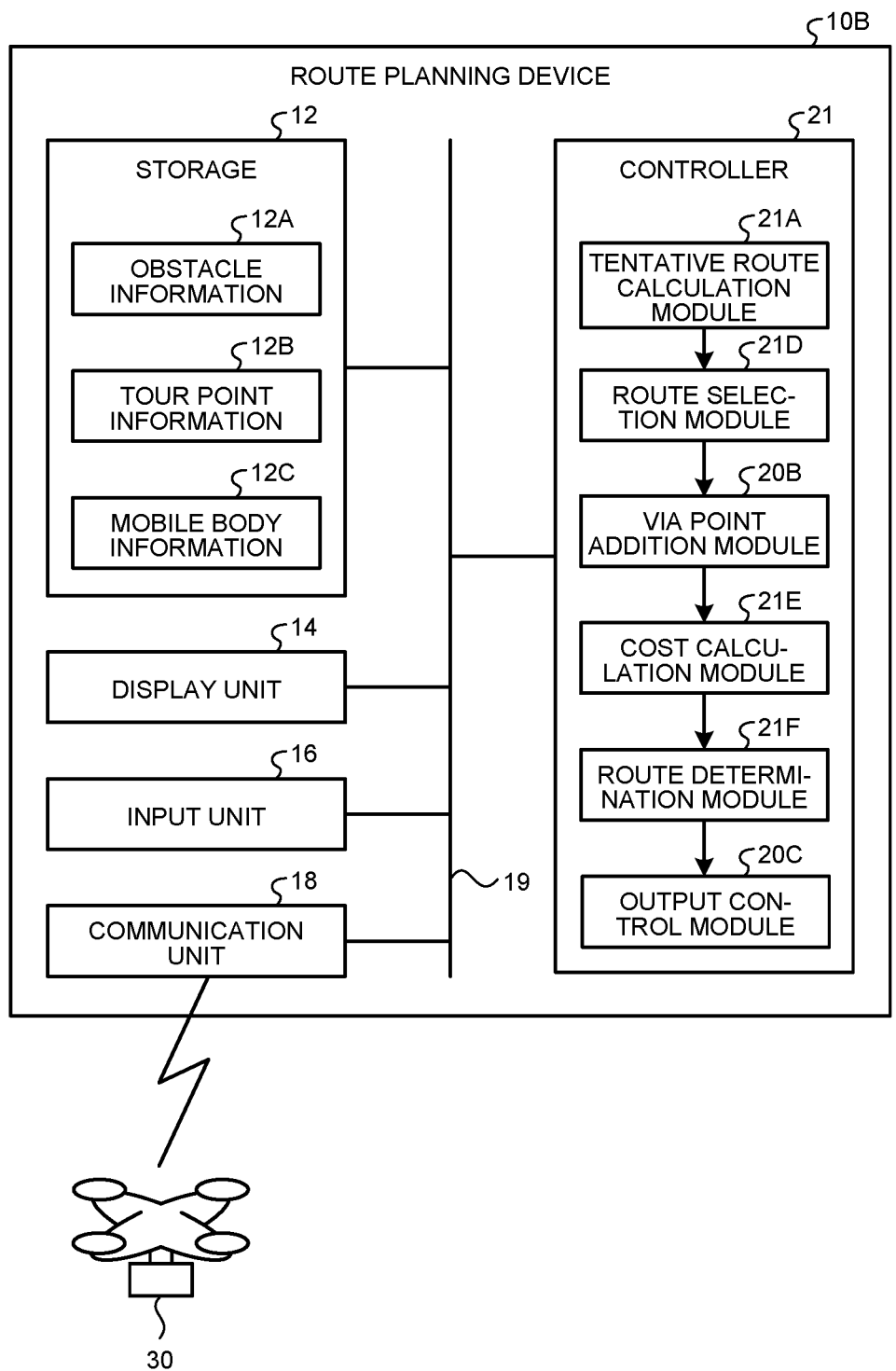
FIG. 10 is a schematic diagram of a route planning system according to the embodiment.

FIG. 10 is a schematic diagram illustrating an example of a route planning system 1B according to the present embodiment.

The route planning system 1B includes a route planning device 10B and the mobile body 30. The route planning device 10B and the mobile body 30 are communicatively connected. The mobile body 30 is the same as that of the first embodiment.

The route planning device 10B includes the storage 12, the display unit 14, the input unit 16, the communication unit 18, and a controller 21. The storage 12, the display unit 14, the input unit 16, the communication unit 18, and the controller 21 are communicatively connected via the bus 19 and the like. The route planning device 10B is the same as the route planning device 10 of the first embodiment described above, except that it includes the controller 21 instead of the controller 20.

The controller 21 includes a tentative route calculation module 21A, a route selection module 21D, the via point addition module 20B, a cost calculation module 21E, a route determination module 21F, and the output control module 20C. The tentative route calculation module 21A, the route selection module 21D, the via point addition module 20B, the cost calculation module 21E, the route determination module 21F, and the output control module 20C are achieved by a single or a plurality of processors, for example. For example, each of the above units may be achieved by having a processor such as a CPU execute a computer program, that is, by software. Each of the above units may also be achieved by a processor such as a dedicated IC, that is, by hardware. Each of the above units may also be achieved by using a combination of software and hardware. In a case of using a plurality of processors, each of the processors may achieve one of the units or may achieve two or more of the units.

The tentative route calculation module 21A calculates the tentative route 50 in the same manner as that of the tentative route calculation module 20A of the first embodiment. However, in the present embodiment, the tentative route calculation module 21A calculates a plurality of tentative routes 50 in which at least part of the via routes of the tour points 40 is different from each other.

That is, the tentative route calculation module 20A of the first embodiment described above outputs the tentative route 50 of the lowest cost. On the contrary, the tentative route calculation module 21A of the present embodiment outputs a plurality of tentative routes 50 and the cost of each of the tentative routes 50. The tentative route calculation module 21A may calculate the cost of the tentative routes 50 in the same manner as that of the tentative route calculation module 20A of the first embodiment described above.

The route selection module 21D controls the via point addition module 20B to repeat the above route derivation processing to derive the route 60 acquired by adding the via points 48 to the tentative route 50 for each of the tentative routes 50 calculated by the tentative route calculation module 21A, in an ascending order from the tentative route 50 of the lowest cost.

In detail, the route selection module 21D sorts the tentative routes 50 calculated by the tentative route calculation module 21A in an ascending order of the cost, which is the order from the lowest cost. Then, the route selection module 21D reads, in order, the tentative routes 50 that have not yet undergone the route derivation processing by the via point addition module 20B and have the lowest cost among the tentative routes 50, and outputs those to the via point addition module 20B.

The via point addition module 20B sequentially receives the tentative routes 50 output from the route selection module 21D in an ascending order of the cost, and executes the same route derivation processing as that of the first embodiment every time a single tentative route 50 is received.

The cost calculation module 21E calculates the cost of the route 60 derived by the via point addition module 20B.

When the route derivation processing by the via point addition module 20B satisfies a termination condition, the route determination module 21F determines the route 60 of the lowest cost to be the suboptimal route 60, and outputs it to the output control module 20C.

In detail, the route determination module 21F determines that the termination condition is satisfied, when the number of repetitions of the route derivation processing by the via point addition module 20B becomes equal to or greater than a threshold, and the calculation time of the route derivation processing becomes equal to or longer than a prescribed time or the cost of the route 60 derived by the via point addition module 20B is equal to or lower than the cost of another tentative route 50 that is the next lowest with respect to the cost of the tentative route 50 used to derive the route 60.

Specifically, when the number of repetitions of the route derivation processing by the via point addition module 20B is equal to or greater than the threshold, the route determination module 21F determines the route 60 derived immediately before by the via point addition module 20B to be the suboptimal route 60 and outputs it to the output control module 20C. This threshold may be defined in advance. Furthermore, the threshold value may also be changeable by an operation instruction or the like of the user via the input unit 16.

Note that when the number of repetitions of the route derivation processing by the via point addition module 20B is equal to or greater than the threshold, the route determination module 21F may determine, among the routes 60 derived by the via point addition module 20B, the route 60 of the lowest cost to be the suboptimal route 60 and output it to the output control module 20C Furthermore, when the calculation time of the route derivation processing becomes equal to or longer than the prescribed time, the route determination module 21F determines that the route 60 derived immediately before by the via point addition module 20B as the suboptimal route 60 and outputs it to the output control module 20C. The calculation time of the route derivation processing is the time elapsed since the route derivation processing is started by the via point addition module 20B. The prescribed time may be defined in advance. The prescribed time may also be changeable by an operation instruction or the like of the user via the input unit 16.

When the calculation time of the route derivation processing by the via point addition module 20B becomes equal to or longer than the prescribed time, the route determination module 21F may determine, among the routes 60 derived by the via point addition module 20B, the route 60 of the lowest cost to be the suboptimal route 60 and output it to the output control module 20C.

Furthermore, when the cost of the route 60 derived by the via point addition module 20B is equal to or lower than the cost of another tentative route 50 that is the next lowest with respect to the cost of the tentative route 50 used to derive the route 60, the route determination module 21F determines the route 60 as the suboptimal route 60 and outputs it to the output control module 20C.

When determined that the termination condition is not satisfied, the route determination module 21F determines that the route 60 derived immediately before by the via point addition module 20B as the tentative route 50. Then, the route determination module 21F adds the tentative route 50 to a group of tentative routes 50 calculated by the tentative route calculation module 21A and sorts them in an ascending order of the cost, which is the order from the lowest cost. Then, the route selection module 21D may read, in order, the tentative routes 50 that have not yet undergone the route derivation processing by the via point addition module 20B and have the lowest cost among the tentative routes 50, and output those to the via point addition module 20B.

Furthermore, the route determination module 21F may output the route 60 selected by the user among the routes 60 derived by repeating the route derivation processing to the output control module 20C as the suboptimal route 60.

The output control module 20C may output the route 60 that is determined by the route determination module 21F to be suboptimal to the display unit 14 and the mobile body 30.

As in the first embodiment, the output control module 20C may change the route 60, upon receiving instruction information that includes at least one of an instruction to add an additional via point to the route 60 displayed on the display unit 14 and an instruction to change the positions of the via points 48 included in the route 60.

At this time, the output control module 20C may further display a group of the tentative routes 50 on the display unit 14. In this case, the user may select the tentative route 50 to be used for deriving the route 60 by operating the input unit 16 and selecting a desired tentative route 50 from the displayed group of the tentative routes 50. Then, the output control module 20C may control the via point addition module 20B to derive the route 60 by using the selected tentative route 50.

Next, an example of a flow of information processing executed by the route planning device 10B according to the present embodiment will be described.

Figure 11:
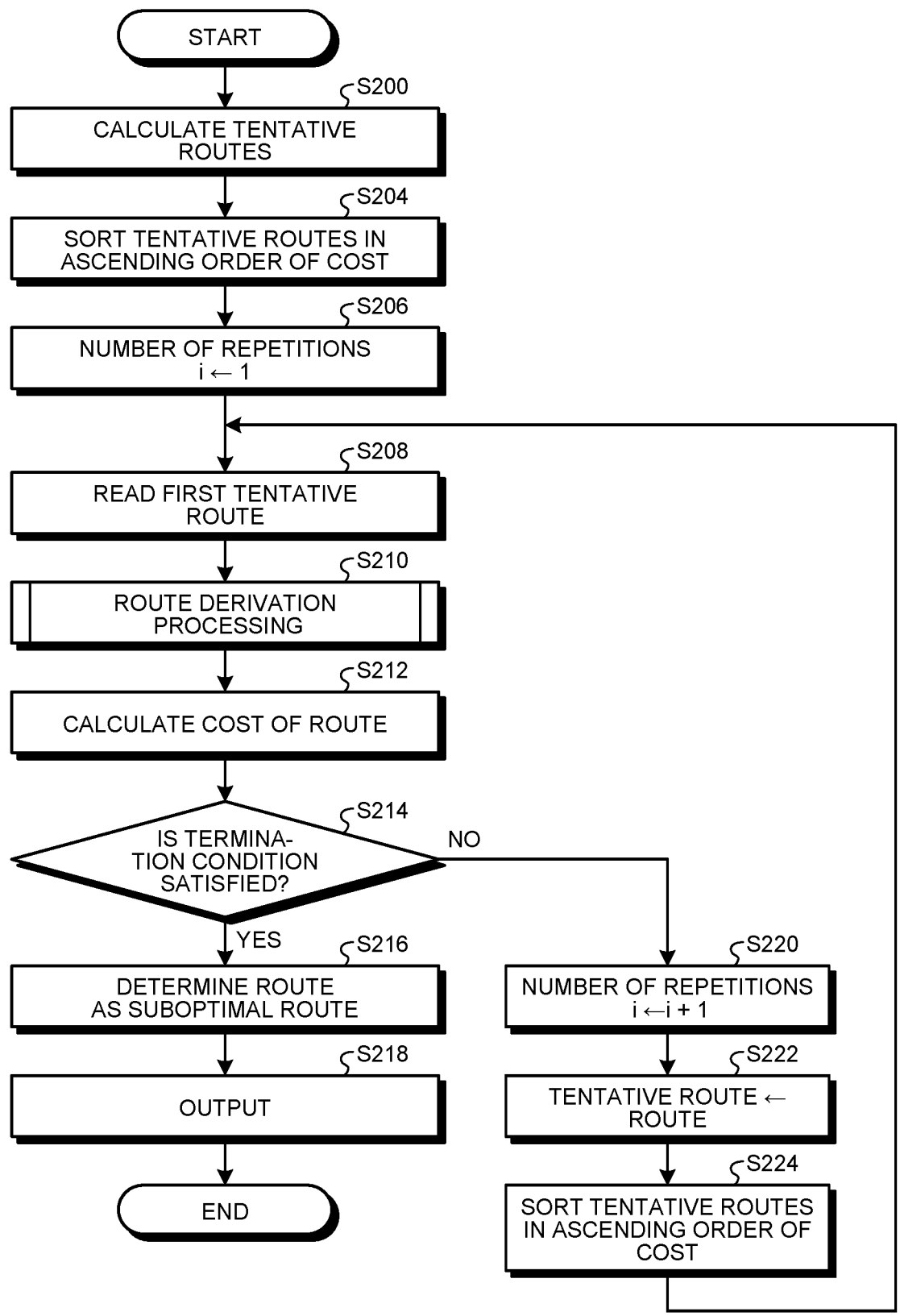
FIG. 11 is a flowchart illustrating a flow of information processing.

FIG. 11 is a flowchart illustrating an example of the flow of the information processing executed by the route planning device 10B according to the present embodiment.

The tentative route calculation module 21A calculates a plurality of tentative routes 50 in which at least part of the via routes of the tour points 40 is different from each other and the cost of the tentative routes 50 (step S200).

The route selection module 21D sorts the tentative routes 50 calculated at step S200 in an ascending order of the cost, which is the order from the lowest cost (step S204).

Then, the route selection module 21D sets "1" representing the number of repetition time 1 to the number of repetitions i of the route derivation processing executed by the via point addition module 20B (step S206).

Then, the first tentative route 50 is read in order from the lowest cost, and output to the via point addition module 20B (step S208). The via point addition module 20B uses the first tentative route 50 to execute the route derivation processing (step S210). The processing of step S210 is similar to steps S102 to S124 described in the first embodiment (see FIG. 9).

Then, the cost calculation module 21E calculates the cost of the route 60 that is derived by the via point addition module 20B by performing the route derivation processing of step S210 (step S212).

Thereafter, the route determination module 21F determines whether the route derivation processing of step S210 satisfies the termination condition (step S214). For example, the route determination module 21F determines that the termination condition is satisfied, when the number of repetitions i is equal to or greater than the threshold, and the calculation time of the route derivation processing becomes equal to or longer than the prescribed time or the cost of the route 60 calculated at step S212 is equal to or lower than the cost of another tentative route 50 that is the next lowest with respect to the cost of the tentative route 50 used to derive the route 60.

When determined positive at step S214 (Yes at step S214), the processing proceeds to step S216. At step S216, the route determination module 21F determines that the route 60 derived by the route derivation processing of S210 performed right before is the suboptimal route 60 and outputs it to the output control module 20C (step S216). As described above, the route determination module 21F may determine the route 60 of the lowest cost among the routes 60 derived by the route derivation processing of step S210 as the suboptimal route 60, and output it to the output control module 20C.

The output control module 20C outputs the route 60 that is determined to be suboptimal at step S216 to the display unit 14 and the mobile body 30 (step S218). Then, the present routine is terminated.

In the meantime, when the route determination module 21F determines that the termination condition is not satisfied (No at step S214), the processing proceeds to step S220. At step S220, the route selection module 21D adds 1 to the number of repetitions i of the route derivation processing (step S220).

Then, the route determination module 21F determines the route 60 derived by the route derivation processing of step S210 performed right before as the tentative route 50 (step S222). Then, the route determination module 21F adds the tentative route 50 to the tentative routes 50 calculated at step S200, and sorts them in an ascending order of the cost, which is the order from the lowest cost (step S224). Then, the processing returns to step S208 described above.

As described above, in the route planning device 10B of the present embodiment, for each of the tentative routes 50 in which at least part of the via routes of the tour points 40 is different from each other, the route selection module 21D controls the via point addition module 20B so as to repeat, in order from the tentative route 50 of the lowest cost, the route derivation processing for deriving the route 60 acquired by adding the via points 48 to the tentative route 50. When the route derivation processing satisfies the termination condition, the route determination module 21F determines the route 60 of the lowest cost to be the suboptimal route 60.

Therefore, by repeating the route derivation processing, the route planning device 10B of the present embodiment can derive the suboptimal route 60 in addition to achieving the effects of the first embodiment described above.

Note that the scope of application of the route planning device 10 and the route planning device 10B according to the embodiments described above is not limited. For example, the mobile body 30 that moves along the route 60 derived by the route planning device 10 and the route planning device 10B is not limited to a drone. As described above, the mobile body 30 may also be a flying object other than a drone, a ship, a vehicle, a robot, or the like.

The route planning device 10 and the route planning device 10B according to the embodiments are described by referring, as an example, to a mode in which the tentative route 50 is a tour route that passes through the tour points 40 at least once and the route 60 is a tour route that passes through the points including the tour points 40 and the via points 48 at least once. However, the tentative route 50 and the route 60 are not limited to such tour routes. That is, derivation of the tentative route 50 and the route 60 by the route planning device 10 and the route planning device 10B according to the embodiments is not limited to traveling problems, but can also be applied to route finding problems.

Next, an example of the hardware configuration of the route planning device 10 and the route planning device 10B according to the embodiments will be described.

Figure 12:
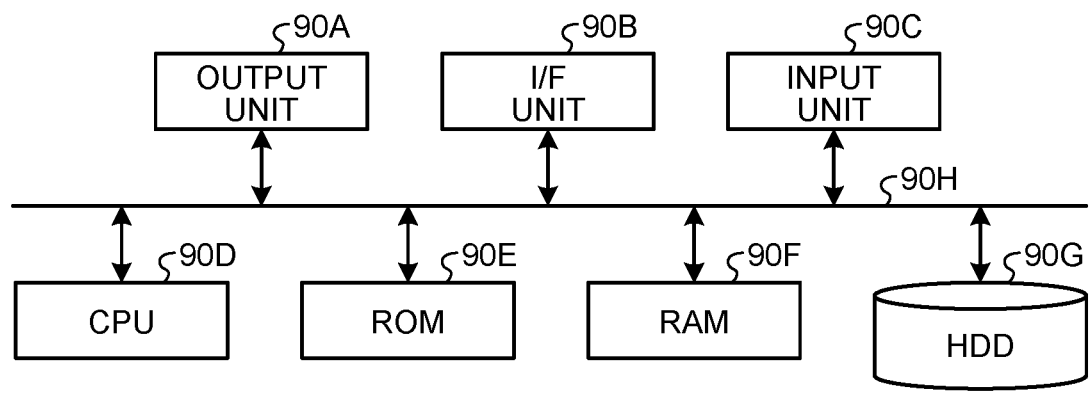
FIG. 12 is a hardware configuration diagram.

FIG. 12 is a hardware configuration diagram illustrating an example of the route planning device 10 and the route planning device 10B according to the embodiments.

The route planning device 10 and the route planning device 10B according to the embodiments are in a hardware configuration using a typical computer, including a control device such as a central processing unit (CPU) 90D, storage devices such as read only memory (ROM) 90E, a random access memory (RAM) 90F, and a hard disk drive (HDD) 90G, an interface for various devices, such as an I/F unit 90B, an output unit 90A that outputs various kinds of information, an input unit 90C that receives operations of the user, and a bus 90H that connects each of the units.

In the route planning device 10 and the route planning device 10B according to the embodiments, the CPU 90D reads out a computer program from the ROM 90E and executes it on the RAM 90F, thereby achieving each of the units on the computer.

Note that the computer program for executing each of the above described processing performed by the route planning device 10 and the route planning device 10B according to the embodiments may be stored in the HDD 90G. The computer program for executing each of the above described processing performed by the route planning device 10 and the route planning device 10B according to the embodiments may also be provided by being mounted to the ROM 90E in advance.

Furthermore, the program for executing the above described processing performed by the route planning device 10 and the route planning device 10B according to the embodiments may be stored in an installable or executable format file on a computer-readable storage medium such as a CD-ROM, a CD-R, a memory card, a digital versatile disc (DVD), a flexible disk (FD), or the like, and provided as a computer program product. The computer program for executing the above described processing performed by the route planning device 10 and the route planning device 10B according to the embodiments may also be stored on a computer connected to a network such as the Internet, and provided by being downloaded via the network. Furthermore, the computer program for executing the above described processing performed by the route planning device 10 and the route planning device 10B according to the embodiments may also be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A route planning device comprising:
a memory; and
one or more processors coupled to the memory and configured to:
calculate a tentative route passing through a plurality of tour points disposed in a virtual space that is acquired by removing an obstacle from a space including the obstacle; and
derive with a calculation accuracy corresponding to a precision of via point calculation, a route with one or more via points added around an interference point between the obstacle included in the space and the tentative route,
wherein
the one or more processors are further configured to:
calculate, based on at least one selected from a collision severity of the obstacle and an obstacle avoidance performance of a mobile body, the precision to be lower as the collision severity is lower and to be lower as the obstacle avoidance performance is higher;
search a search space with a search accuracy corresponding to the precision, and add the one or more via points around the interference point; and
output the tour points and the one or more via points to a display in different display modes,
wherein
the one or more processors are further configured to:
change a density of a group of elements in obstacle information of the obstacle expressed by the group of elements, which are three-dimensional voxels in a three-dimensional space, to a lower density as the precision is lower;
identify the interference point between the obstacle expressed by the changed obstacle information and the tentative route;
search the search space based on the precision and the interference point, and adds the one or more via points around the interference point; and
identify the interference point between the tentative route and an obstacle area with a wider margin area added around the obstacle as the precision is higher.

2. The device according to claim 1, wherein the one or more processors are configured to calculate the one or more via points with a lower accuracy as the precision is lower.

3. The device according to claim 1, wherein the one or more processors are configured to search the search space for each search point at a longer search interval as the precision is lower, and add the one or more via points to the search point around the interference point.

4. The device according to claim 1, wherein the one or more processors are further configured to output the route.

5. The device according to claim 4, wherein the one or more processors are configured to change the route based on instruction information, upon receiving the instruction information including at least one selected from an instruction to add an additional via point to the route and an instruction to change a position of the via point.

6. The device according to claim 1, wherein the obstacle avoidance performance is defined by at least one selected from an observation accuracy of the mobile body and a positioning accuracy of the mobile body.

7. The device according to claim 1, wherein the one or more processors are configured to derive the route by adding the input one or more via points to the tentative route.

8. The device according to claim 1, wherein the tentative route comprises the tour points and a straight line connecting the tour points.

9. The device according to claim 1, wherein the one or more processors are further configured to, when a total length of the route is less than a length acquired by adding a threshold to a total length of the tentative route used for calculation of the route, identify the route as an output target route.

10. The device according to claim 1, wherein the tentative route is a tour route that passes through the tour points at least once.

11. The device according to claim 1, wherein
the one or more processors are further configured to:
control, for each of a plurality of the tentative routes with at least part of a via route of the tour points being different from each other, the via point addition processing to repeat, in order from the tentative route of a lowest cost, route derivation processing for deriving a route acquired by adding the one or more via points to the tentative route; and
determine the route of a lowest cost to be a suboptimal route, when the route derivation processing satisfies a termination condition.

12. The device according to claim 11, wherein the one or more processors are configured to determine that the termination condition is satisfied, when a number of repetitions of the route derivation processing is equal to or greater than a threshold, and a calculation time of the route derivation processing becomes equal to or longer than a prescribed time or a cost of the derived route is equal to or lower than a cost of another tentative route that is next lowest with respect to the cost of the tentative route used to derive the route.

13. The device according to claim 11, wherein the one or more processors are configured to determine the route selected by a user as the suboptimal route, among a plurality of the routes derived by repeating the route derivation processing.

14. The device according to claim 1, wherein the precision is calculated by using following equations $$p1 = k_{obs} 1/m_{obs} + \varepsilon$$

$$p2 = p1 + k_{col} m_{col}$$

where p1 represents a first precision, p2 represents the final calculated precision, $k_{obs}$ and $k_{col}$ represent gains, $\varepsilon$ is a number greater than zero, $m_{col}$ represents the collision severity, and $m_{obs}$ represents the obstacle avoidance performance $m_{obs}$.

15. A route planning method comprising:
calculating a tentative route passing through a plurality of tour points disposed in a virtual space that is acquired by removing an obstacle from a space including the obstacle; and
deriving, with a calculation accuracy corresponding to a precision of via point calculation, a route with one or more via points added around an interference point between the obstacle included in the space and the tentative route,
wherein
the method further includes:
- calculating, based on at least one selected from a collision severity of the obstacle and an obstacle avoidance performance of a mobile body, the precision to be lower as the collision severity is lower and to be lower as the obstacle avoidance performance is higher;
- searching a search space with a search accuracy corresponding to the precision, and add the one or more via points around the interference point; and
- outputting the tour points and the one or more via points to a display in different display modes, wherein
the method further includes:
- changing a density of a group of elements in obstacle information of the obstacle expressed by the group of elements, which are three-dimensional voxels in a three-dimensional space, to a lower density as the precision is lower;
- identifying the interference point between the obstacle expressed by the changed obstacle information and the tentative route;
- searching the search space based on the precision and the interference point, and adds the one or more via points around the interference point; and
- identifying the interference point between the tentative route and an obstacle area with a wider margin area added around the obstacle as the precision is higher.

16. A computer program product comprising a non-transitory computer-readable medium including programmed instructions, the instructions causing a computer to execute a method comprising:

calculating a tentative route passing through a plurality of tour points disposed in a virtual space that is acquired by removing an obstacle from a space including the obstacle; and deriving, with a calculation accuracy corresponding to a precision of via point calculation, a route with one or more via points added around an interference point between the obstacle included in the space and the tentative route, wherein
the method further includes:
- calculating, based on at least one selected from a collision severity of the obstacle and an obstacle avoidance performance of a mobile body, the precision to be lower as the collision severity is lower and to be lower as the obstacle avoidance performance is higher;
- searching a search space with a search accuracy corresponding to the precision, and add the one or more via points around the interference point; and
- outputting the tour points and the one or more via points to a display in different display modes, wherein
the method further includes:
- changing a density of a group of elements in obstacle information of the obstacle expressed by the group of elements, which are three-dimensional voxels in a three-dimensional space, to a lower density as the precision is lower;
- identifying the interference point between the obstacle expressed by the changed obstacle information and the tentative route;
- searching the search space based on the precision and the interference point, and adds the one or more via points around the interference point; and
- identifying the interference point between the tentative route and an obstacle area with a wider margin area added around the obstacle as the precision is higher.

* * * * *